(12) United States Patent
Matsunaga et al.

(10) Patent No.: US 6,959,103 B2
(45) Date of Patent: Oct. 25, 2005

(54) DISPLACEMENT SENSOR HAVING A DISPLAY DATA OUTPUT

(75) Inventors: Tatsuya Matsunaga, Kyoto (JP); Masahiro Kawachi, Kyoto (JP)

(73) Assignee: Omron Corporation, Kyoto (JP)

( * ) Notice: Subject to any disclaimer, the term of this patent is extended or adjusted under 35 U.S.C. 154(b) by 420 days.

(21) Appl. No.: 09/770,379

(22) Filed: Jan. 29, 2001

(65) Prior Publication Data

US 2002/0034317 A1    Mar. 21, 2002

(30) Foreign Application Priority Data

| Jan. 31, 2000 | (JP) | ............................ 2000-027429 |
| Dec. 15, 2000 | (JP) | ............................ 2000-382665 |

(51) Int. Cl.[7] ............................................ G06K 9/00
(52) U.S. Cl. ..................... 382/106; 382/201; 356/3; 356/496; 356/623; 342/95; 73/1.79; 73/54.33
(58) Field of Search .............................. 382/106, 107, 382/154, 201; 356/3, 3.01, 496, 623, 600; 396/89; 342/95; 348/139; 73/1.79, 54.14, 73/54.33

(56) References Cited

U.S. PATENT DOCUMENTS

| 4,612,581 | A | * | 9/1986 | Endo et al. ............... 348/219.1 |
| 5,905,576 | A | * | 5/1999 | Takada et al. ............... 356/623 |
| 5,923,427 | A | * | 7/1999 | Dong .......................... 356/623 |
| 5,969,820 | A | * | 10/1999 | Yoshii et al. ................ 356/623 |
| 6,147,758 | A | * | 11/2000 | Okabe et al. ................ 356/600 |
| 6,159,151 | A | * | 12/2000 | Bonnefous .................. 600/440 |
| 6,504,947 | B1 | | 1/2003 | Nozaki et al. |
| 6,549,650 | B1 | * | 4/2003 | Ishikawa et al. ............ 382/154 |
| 6,724,491 | B2 | | 4/2004 | Matsunaga et al. |
| 2002/0154318 | A1 | * | 10/2002 | Matsunaga et al. ......... 356/623 |
| 2003/0007680 | A1 | * | 1/2003 | Iijima et al. ................ 382/154 |
| 2003/0067613 | A1 | * | 4/2003 | Ishikawa et al. ............ 356/614 |

FOREIGN PATENT DOCUMENTS

| JP | 57-137082 | 8/1982 |
| JP | 03-186706 | 8/1991 |
| JP | 4-308976 | 10/1992 |
| JP | 05-022639 | 1/1993 |
| JP | 5-15201 | 3/1993 |
| JP | 05-071932 | 3/1993 |
| JP | 7-77419 | 3/1995 |
| JP | 07-200828 | 8/1995 |
| JP | 07-294250 | 11/1995 |
| JP | 08-194734 | 7/1996 |

(Continued)

OTHER PUBLICATIONS

Setsu Kusa, "Deviation Quantity Measuring Device for Vehicle", Patent Abstracts of Japan, Publication No. 07-077419, Mar. 20, 1995, 21 pp. (Corresponds to B1).

*Primary Examiner*—Bhavesh M. Mehta
*Assistant Examiner*—Barry Choobin
(74) *Attorney, Agent, or Firm*—Foley & Lardner LLP

(57) ABSTRACT

Provided is a displacement sensor which allows at least part of the data used from the time of obtaining an image until the time of computing the displacement can be readily verified. In a displacement sensor for automatically extracting a coordinate of a measuring point from an image obtained by using an imaging device according to a prescribed measuring point extraction algorithm, and computing a desired displacement from the automatically extracted measuring point coordinate, the sensor is further provided with the function to edit data used from the time of obtaining the image until the time of computing the displacement for use as display data for an image monitor.

19 Claims, 23 Drawing Sheets

FOREIGN PATENT DOCUMENTS

| | | |
|---|---|---|
| JP | 8-219721 | 8/1996 |
| JP | 08-313217 | 11/1996 |
| JP | 09-243333 | 9/1997 |

* cited by examiner (a) example of the monitor display (b) relation between the sensor head and the object (a) example of the monitor display (b) relation between the sensor head and the object (a) example of the monitor display (b) relation between the sensor head and the object

DISPLACEMENT SENSOR HAVING A DISPLAY DATA OUTPUT

TECHNICAL FIELD

The present invention relates to a displacement sensor for measuring a displacement such as a dimension of an object according to a light section image or the like.

BACKGROUND OF THE INVENTION

The displacement sensor for measuring a displacement such as a dimension of an object according to a light section image (image obtained by using a light section method) is known in the art. Typically, a displacement sensor of this type automatically extracts a coordinate of a measuring point from an image obtained by using an imaging device in a sensor head according to a prescribed measuring point extraction algorithm, and computes a desired displacement from the automatically extracted measuring point coordinate.

The sensor head is incorporated with a laser diode for emitting a spot beam (beam having an extremely small circular cross section) or a line beam (beam having a linear cross section), and an imaging device (one-dimensional CCD, two-dimensional CCD or the like) for monitoring a region containing a radiation point of the beam from a different angle, and producing an image containing a variation corresponding to a displacement of the monitored object.

The main unit automatically extracts a measuring point coordinate from the image obtained from each sensor head according to a measuring point extraction algorithm designated by the user. Then, the actual displacement is computed from the automatically extracted measuring point coordinate by using a triangular computation or the like. If a range of variation tolerance (threshold value) is defined for the displacement, a tolerance determination process is performed, and a binary signal indicating the acceptability of the object can be obtained.

According to such a conventional displacement sensor, if the measuring point extraction algorithm or the like is designated in advance, a measuring point coordinate can be automatically extracted from the image obtained, and the desired displacement can be computed in the end so that no effort is required for the user.

However, it does not provided any means for verifying the data (such as the raw image from the imaging device, the automatically extracted measuring point coordinate and various automatically defined threshold values or the like) which is used during the entire process of obtaining the image and computing the displacement.

Therefore, when the measured displacement turns out to be abnormal or when an unacceptable measurement result is obtained, it is not possible to distinguish for the user if it is due to the abnormal condition of the object or due to the abnormal operation of the sensor, possibly due to the influences of external light or the like.

Furthermore, the conventional displacement sensor is not capable of defining the field of view of the imaging device at will, for example, to extract a measuring point at will. This is a particularly significant problem of a displacement sensor with two-dimensional imaging devices (such as two-dimensional CCD or the like). Specifically, because, in normal cases, there are a plurality (typically in the order of tens) of columns of pixels extending in the direction of the displacement in a mutually parallel relationship, the need for finding a peak point and a bottom point from each of these columns creates a serious difficulty when implementing the sensor as a commercial product.

BRIEF SUMMARY OF THE INVENTION

In view of such problems of the prior art, a primary object of the present invention is to provide such a displacement sensor which is easy to use.

A more specific object of the present invention is to provide a displacement sensor which allows the data used from the time of obtaining the image until the time of computing the displacement to be easily verified.

A more specific object of the present invention is to provide a displacement sensor which allows the filed of view of the imaging device to be selected, and the measuring point to be extracted at will.

These and other objects and effects of the present invention will become more apparent to a person skilled in the art from the following description.

The present invention provides a displacement sensor for automatically extracting a coordinate of a measuring point from an image obtained by using an imaging device according to a prescribed measuring point extraction algorithm, and computing a desired displacement from the automatically extracted measuring point coordinate.

The "imaging device" means any imaging device which has a plurality of pixels in the direction of displacement measurement, and allows the address of each light receiving position corresponding to a displacement to be identified. Therefore, imaging devices such as PSD which would not allow the address of each light receiving position to be identified are excluded from the concept of the present invention. The imaging device as used herein include one-dimensional CCDs and two-dimensional CCDs among other possibilities.

The "measuring point extraction algorithm" may comprise any one of a number of known algorithms. Such known algorithms may include peak value searching algorithms, bottom value searching algorithms, average value searching algorithms and most proximate value searching algorithms, among other possibilities.

The "measuring point coordinate" means coordinate data on which the computation of the displacement is based. This coordinate data can be determined at the precision level of pixels or sub-pixels. When the imaging device consists of a two-dimensional imaging device, each measuring point coordinate will have a two-dimensional value. However, the basis for the displacement computation will be typically found in the coordinate values in the direction of the displacement.

The "automatic extraction" means that there is no human intervention. However, it does not exclude the possibility of dialog processes such as the one inquiring the user of the selection of modes during the course of extracting the measuring point coordinate.

The "computation formula based on a measuring point coordinate" may vary depending on the optical arrangement of the sensor head. It typically consists of obtaining a displacement from a measuring point coordinate according to the principle of triangulation.

The output from the displacement sensor is not limited to the computed displacement data as can be readily appreciated. For instance, a threshold level for a tolerable range may be designated by the user so that the determination result indicating if the particular product is acceptable or not may be produced.

In addition to the above mentioned structure, the displacement sensor of the present invention may comprise display data editing means for editing the data used from the time of obtaining the image until the time of computing the displacement for use as display data for an image monitor.

The "data used from the time of obtaining the image until the time of computing the displacement" may include any conceivable data such as the raw image obtained by the imaging device, the automatically extracted measuring point coordinate and various threshold values that are automatically defined, as well as data of other kinds that can be automatically and erroneously defined due to external light or the like because of the automatic nature of the algorithm.

The "display data editing means" implies that the image monitor is not an indispensable element of the displacement sensor of the present invention. In other words, it suffices for the displacement sensor of the present invention to be provided with display data editing means. The displacement sensor of the present invention may be originally provided with an image monitor as an integral part thereof, or, alternatively, it may be optionally fitted with a commercially available image monitor when such a need arises.

According to the present invention having the above described structure, the data used from the time of obtaining the image until the time of computing the displacement can be readily verified via the display on the image monitor, and it allows any abnormal value of the measured displacement to be distinguished if the object for measurement is indeed abnormal or if it is a result of the abnormal operation of the sensor due to external light or the like.

According to a preferred embodiment of the present invention, the display data for the image monitor corresponds to a raw image obtained by the imaging device.

The "raw image" as used herein means an image of an object to be measured which is obtained by the imaging device.

According to this structure, it is possible to readily verify where on the surface of the object to be measured the measuring light (section light) is being impinged, if external light is being impinged upon the surface of the object to be measured, and how much is the brightness of the illuminating light image of the measuring light.

According to a preferred embodiment of the present invention, the display data for the image monitor corresponds to a raw image obtained by the imaging device, and a graphic image indicating a coordinate of a measuring point placed over the raw image.

According to this structure, by comparing the image such as a mark indicating the automatically extracted measuring point with the image of the surface of the object to be measured one over the other, one can readily verify if the measuring point has been properly determined at a position on which the measuring light impinges, or if the measuring point has been improperly determined at a position on which external light impinges.

According to a preferred embodiment of the present invention, the display data for the image monitor corresponds to a raw image obtained by the imaging device, and a graphic image indicating a measurement value tolerance range in the direction of displacement measurement shown over the raw image.

According to this structure, by showing the graphic image such as a boundary line indicating the measurement tolerance range and the image of the surface of the object to be measured one over the other, one can readily verify the relationship between the position of the illuminating light image of the measuring light and the measurement tolerance range.

According to a preferred embodiment of the present invention, the display data for the image monitor corresponds to a raw image obtained by the imaging device, and a graphic image indicating a coordinate of a measuring point and a measurement value tolerance range in the direction of displacement measurement shown over the raw image.

According to this structure, by comparing the graphic image such as a boundary line indicating the measurement tolerance range and the graphic image such as a mark indicating the automatically extracted coordinate of the measuring point with the image of the surface of the object to be measured, one can readily verify the relationship between the automatically extracted measuring point coordinate, the position of the illuminating light image of the measuring light and the measurement tolerance range.

According to a preferred embodiment of the present invention, the image displayed on the image monitor according to the display data can be expanded in the direction of displacement measurement.

According to this structure, one can verify the relationship between the automatically extracted measuring point coordinate, the measurement value tolerance range and the image of the surface of the object to be measured even more closely.

According to a preferred embodiment of the present invention, the display data for the image monitor corresponds to the image of a line bright waveform.

The "line bright waveform" means a curve which indicates the distribution of the brightness of the received light along the row of pixels. For instance, it can be represented in a graph having the displacement on the abscissa and the brightness of the received light (gradation) on the ordinate.

According to this structure, the distribution of the brightness along the direction of displacement measurement on the surface of the object to be measured can be verified in an accurate manner.

According to a preferred embodiment of the present invention, the display data for the image monitor corresponds to the line bright waveform and a graphic image indicating a measuring point coordinate shown over the line bright waveform.

According to this structure, by comparing the line bright waveform and the measuring point coordinate, one can readily verify if the measuring point is properly determined on the spot which is illuminated by the measuring light and if the measuring point is improperly determined on the spot which is illuminated by external light.

According to a preferred embodiment of the present invention, the display data for the image monitor corresponds to the line bright waveform and a graphic image indicating a threshold value for extracting the measuring point coordinate shown over the line bright waveform.

According to this structure, by comparing the peak of the line bright waveform and the graphic image such as a line indicating a threshold value, one can verify the process of automatically extracting the measuring point coordinate. If the automatically extracted measuring point coordinate is displayed at the same time, one can verify if the measuring point extraction algorithm has been properly executed or not.

According to a preferred embodiment of the present invention, the display data for the image monitor corresponds to the line bright waveform and a graphic image indicating a measurement value tolerance range in the direction of displacement measurement.

According to this structure, by comparing the peak of the line bright waveform with the graphic image such as a boundary line indicating the measurement tolerance range, one can verify the process of determining the acceptability of each product.

According to a preferred embodiment of the present invention, the display data on the image monitor corresponds to the line bright waveform and graphic images indicating a measuring point coordinate and a measurement value tolerance range in the direction of displacement measurement shown over the line bright waveform.

According to this structure, by comparing the graphic image such as a mark for indicating the automatically extracted measuring point and the graphic image such as a boundary line indicating the measurement value tolerance range with the line bright waveform, one can readily verify the relationship between the peak of the line bright waveform, the automatically extracted measuring point coordinate, and the measurement value tolerance range.

According to a preferred embodiment of the present invention, the image displayed on the image monitor according to the display data can be enlarged in the direction for displacement measurement.

According to this structure, one can verify the relationship between the automatically extracted measuring point coordinate, the measurement value tolerance range, and the line bright of the surface of the object to be measured even more closely.

According to a preferred embodiment of the present invention, the display data for the image monitor corresponds to a raw image obtained by the imaging device and the line bright waveform which are shown one over the other or one next to the other.

According to this structure, one can readily verify the relationship between the visually observed distribution of the brightness on the surface of the object to be measured with the distribution of the brightness on the surface of the object to be measured as represented by the peak of the line bright waveform.

According to a preferred embodiment of the present invention, the display data for the image monitor corresponds to an image combining the raw image obtained from the imaging device and the line bright waveform which are placed one next to the other or one over the other, and the combined image additionally combines an image indicating a measuring point coordinate shown over the raw image and/or the line bright waveform.

According to this structure, one can verify the process of automatically extracting the measuring point coordinate by using both the image of the surface of the object to be measured and the line bright waveform.

According to a preferred embodiment of the present invention, the display data for the image monitor corresponds to an image combining the raw image obtained from the imaging device and the line bright waveform which are placed one next to the other or one over the other, and the combined image additionally combines an image indicating a tolerance range for a measurement value in a direction for measuring the displacement shown over the raw image and/or the line bright waveform.

According to this structure, one can verify the process of determining the acceptability of each product by using both the image of the surface of the object to be measured and the line bright waveform.

According to a preferred embodiment of the present invention, the display data for the image monitor corresponds to an image combining the raw image obtained from the imaging device and the line bright waveform which are placed one next to the other or one over the other, and the combined image additionally combines an image indicating a measuring point coordinate and an image indicating a tolerance range for a measurement value in a direction for measuring the displacement shown over the raw image and/or the line bright waveform.

According to this structure, one can verify the process of automatically extracting the measuring point coordinate and the process of determining the acceptability of each product by using both the image of the surface of the object to be measured and the line bright waveform.

According to a preferred embodiment of the present invention, the image displayed on the image monitor according to the display data can be enlarged in the direction for displacement measurement.

According to this structure, one can verify the process of automatically extracting the measuring point coordinate and the process of determining the acceptability of each product more precisely by using both the image of the surface of the object to be measured and the line bright waveform.

According to a preferred embodiment of the present invention, the image displayed on the image monitor according to the display data corresponds to a raw image obtained from the imaging device and a graphic image indicating a measuring point extracting range defined in a direction perpendicular to the direction of displacement measurement which is placed over the raw image.

According to this structure, one can verify the contents of the measuring point extracting algorithm by comparing the image of the surface of the object to be measured with the graphic image such as a boundary line defining the range of extracting the measuring point.

According to a preferred embodiment of the present invention, the image displayed on the image monitor according to the display data corresponds to a raw image obtained from the imaging device and a graphic image indicating a measuring point extracting range defined in a direction perpendicular to the direction of displacement measurement and an automatically extracted measuring point coordinate which are placed over the raw image.

According to this structure, one can verify if the measuring point extracting algorithm has been properly executed by comparing the image of the surface of the object to be measured with the graphic image such as a boundary line defining the range of extracting the measuring point and the graphic image indicating the automatically extracted measuring point coordinate.

According to a preferred embodiment of the present invention, the image displayed on the image monitor according to the display data corresponds to a trend graph image which shows computed displacements in a time sequence.

According to this structure, one can identify the increasing or decreasing trend of the currently measuring values by comparing the time history of a series of measured values included in the trend graph.

According to another aspect of the present invention, the present invention provides a displacement sensor for automatically extracting a coordinate of a measuring point from an image obtained by using an imaging device according to a prescribed measuring point extraction algorithm, and computing a desired displacement from the automatically extracted measuring point coordinate, further comprising: means for defining a measuring point extraction range on the image obtained by the imaging device; and means for automatically extracting a measuring point coordinate from a part of the image within the measuring point extraction range according to a prescribed measuring point extraction algorithm.

According to a preferred embodiment of the present invention, the measuring point extraction range is defined in the direction for displacement measurement.

According to a preferred embodiment of the present invention, the imaging device consists of a two-dimensional imaging device, and the measuring point extraction range is defined in a direction perpendicular to the direction for displacement measurement.

According to this structure, because the range for extracting the measuring point can be defined over the image obtained from the imaging device, improper extraction due to external light can be avoided. Furthermore, when a two-dimensional imaging device is used, by liming the width of the columns of pixels for measurement to a minimum value, the time required for extracting the measuring point can be minimized.

According to this structure, the convenience of the displacement sensor consisting of a two-dimensional imaging device can be improved. Specifically, because, typically, a plurality (typically tens or more) of columns of pixels extend in the direction of displacement in parallel with one another, the need for extracting a peak point and a bottom point from each column would make the sensor system highly inconvenient to use.

According to another aspect of the present invention, the present invention provides a displacement sensor, comprising: one or a plurality of sensor head each incorporated with a light source for generating a light section beam and an imaging device for imaging an object to be measured which is illuminated by the light section beam; a main unit connected to the sensor head or the sensor heads with an electric cord; a console unit formed integrally with or separately from the main unit for supplying various commands to the main unit; and an image monitor driven by a monitor output obtained from the main unit; the main unit being adapted to automatically extract a coordinate of a measuring point from an image obtained by the sensor head or sensor heads by using a prescribed measuring point extraction algorithm.

The main unit is further adapted to compute a displacement according to the automatically extracted coordinate of the measuring point; the main unit further comprising display data editing means for editing data used from the time of obtaining the image until the time of computing the displacement for use as display data for the image monitor.

According to a preferred embodiment of the present invention, the light section beam consists of a line beam, and the imaging device consists of a two-dimensional imaging device.

According to a preferred embodiment of the present invention, the main unit further comprises means for defining a measuring range on the image obtained by the sensor head according to a prescribed manipulation of a control variable, and means for automatically extracting a coordinate of a measuring point from the image in the measuring range according to a prescribed measuring point extracting algorithm.

According to this structure, the improper operation due to the influences of external light and improper adjustment of various parts can be avoided, and a highly convenient displacement sensor can be provided.

BRIEF DESCRIPTION OF THE DRAWINGS

Now the present invention is described in the following with reference to the appended drawings, in which.

DETAILED DESCRIPTION OF THE PREFERRED EMBODIMENTS

As mentioned earlier, the displacement sensor of the present invention consists of a displacement sensor for automatically extracting a coordinate of a measuring point from an image obtained by using an imaging device according to a prescribed measuring point extraction algorithm, and computing a desired displacement from the automatically extracted measuring point coordinate, characterized by that: the sensor further comprises display data editing means for editing data used from the time of obtaining the image until the time of computing the displacement for use as display data for an image monitor.

Figure 1:
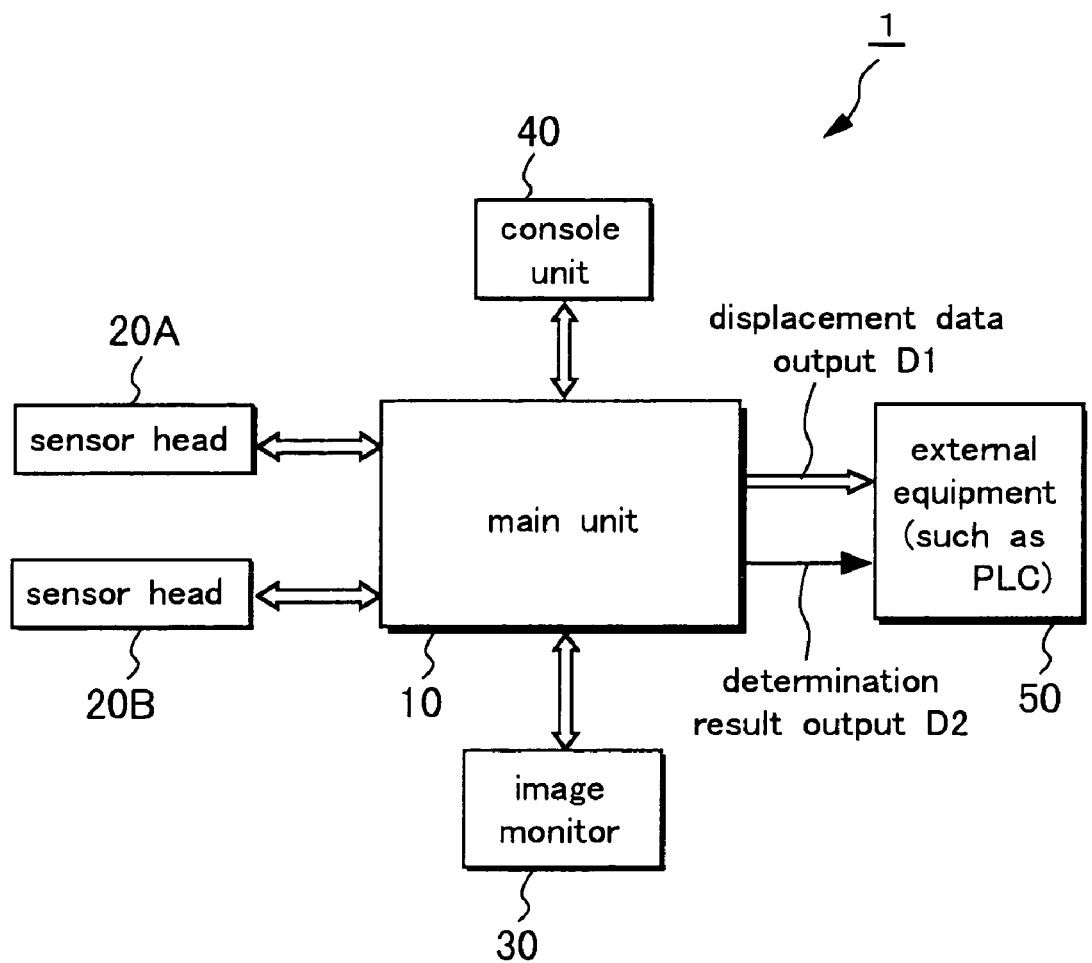
FIG. 1 is a block diagram showing an exemplary displacement system structure embodying the present invention.

FIG. 1 shows a block diagram of the structure of a displacement sensor embodying the present invention.

As shown in the drawing, this displacement sensor 1 comprises a main unit 10, a pair of sensor heads 20A and 20B, an image monitor 30 and a console unit 40. The reference numeral 50 denotes external equipment such as PLC. The main unit 10 is a central part of the displacement sensor, and essentially consists of a microprocessor. The main unit 10 is internally incorporated with various processing functions by using software as described in the following with reference to FIG. 3.

Figure 2:
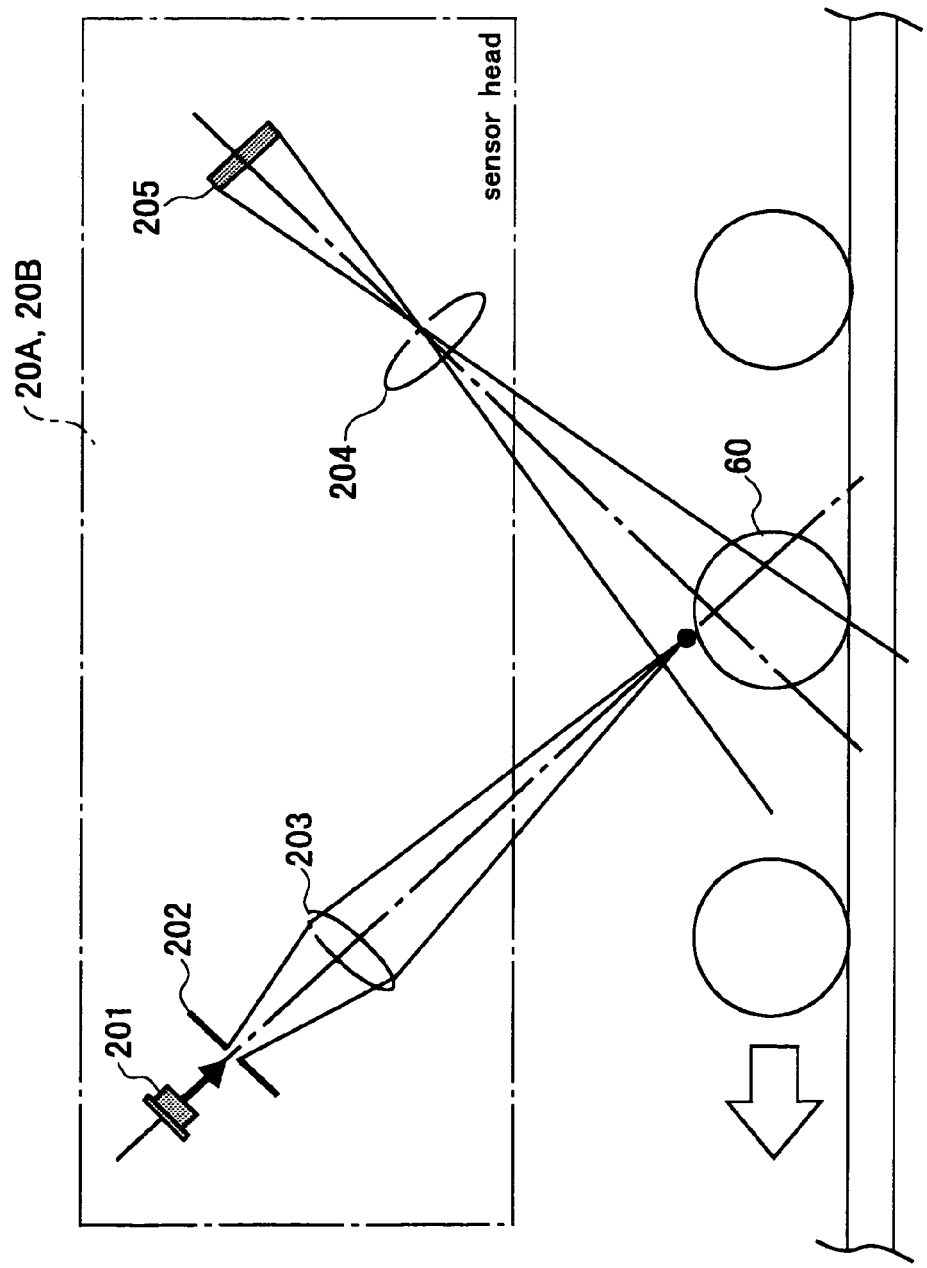
FIG. 2 is an illustrative view showing the outline of the internal structure of the sensor head.

The sensor heads 20A and 20B each detect a displacement and convert it into information on a position on a light receiving surface. An exemplary sensor head 20A or 20B is shown in FIG. 2. As shown in the drawing, the sensor head 20A or 20B comprises a laser diode 201 for emitting laser light, a slit plate 202 placed in front of the laser diode 201, a lens system 203 for focusing the laser light which has passed through the slit plate 202 and impinging onto an object 60 to be detected, and an imaging device 205 for capturing the image obtained from the object 60 via a lens system 204.

The slit of the slit plate 202 is linear so that the light beam which impinges upon the object 60 consists of a line beam (beam having a linear cross section). In this example, the axial direction (direction perpendicular to the cross section of the line beam) of the line beam is perpendicular to the sheet of the paper.

The imaging device 205 in this case consists of a two-dimensional CCD device. In particular, this two-dimensional CCD device has a field of view in the shape of an elongated rectangle. For example, the light receiving surface of the CCD device has 1077 pixels along the long side, and 68 pixels along the short side. The direction of the line beam impinging upon the light receiving surface extends in a direction perpendicular to the long side of the light receiving surface of the CCD device.

Referring to FIG. 1 once again, the console unit 40 is adapted to be portable, and is provided with up and down keys (not shown in the drawing) as well as numeric keys and function keys. The console unit 40 is connected to the main unit 10 via an electric cord.

The image monitor 30 receives a monitor output (display data) from the main unit 10, and displays a corresponding image on its screen. The image monitor 30 may consist of any commercially available monitors such as CRT displays and LCDs.

The external equipment 50 corresponds to a programable controller (PLC) or the like, and receives a displacement data output D1 and a determination result output D2 from the main unit 10. The main unit 10 is a central part of the present invention which automatically extracts a measuring point coordinate from the image obtained by the sensor head 20A or 20B according to a measuring point extraction algorithm designated by the user, computes the actual displacement from the automatically extracted measuring point coordinate by using a triangulation computation or the like, and, if a tolerance range (threshold value) for the displacement is defined, executes a tolerance range determination process, for producing a binary signal which indicates if the object is acceptable or not. The obtained displacement data output D1 and determination result output D2 consisting of a binary signal are forwarded to the external equipment 50.

Figure 3:
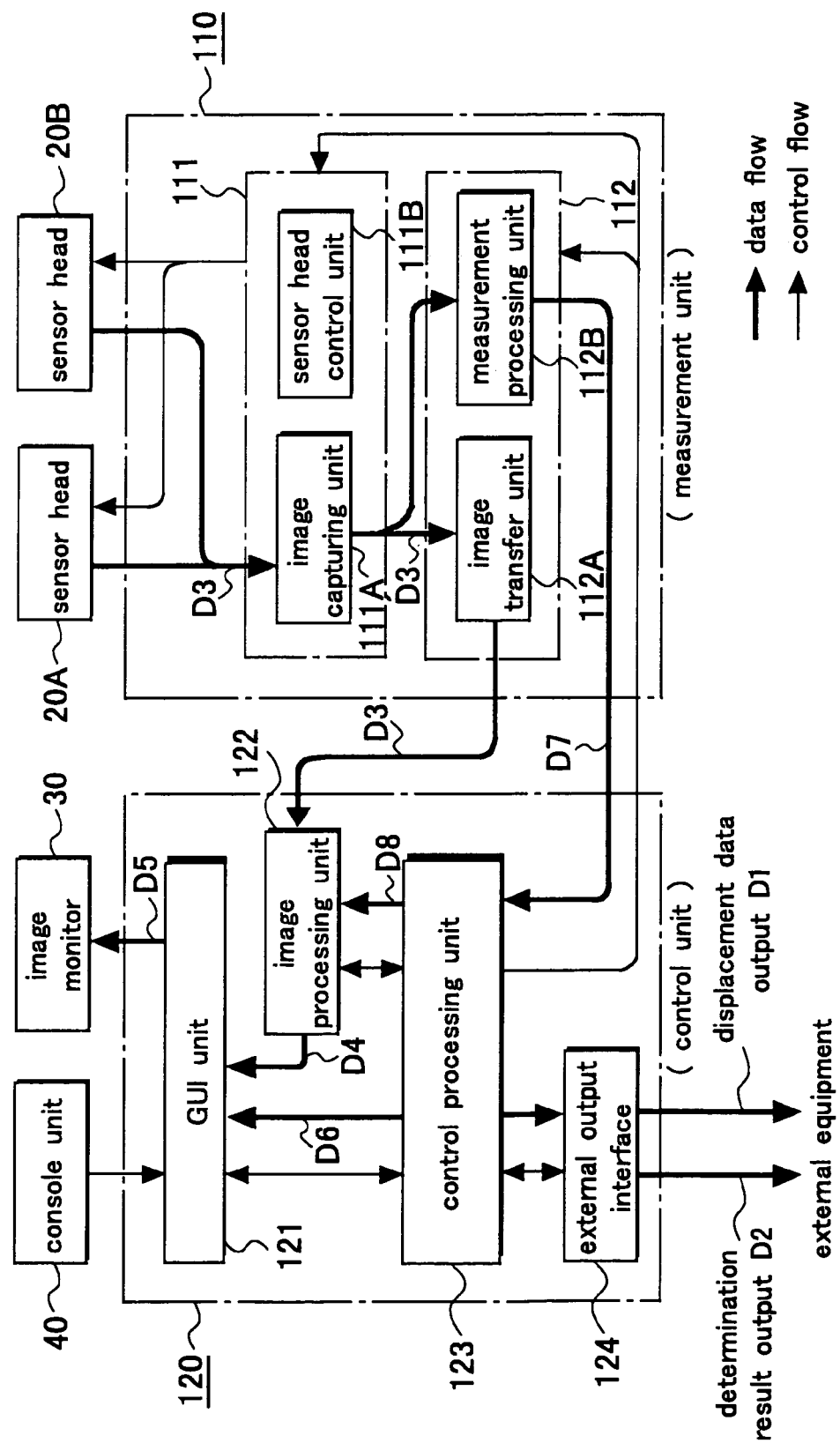
FIG. 3 is a block diagram of the internal structure of the main unit.

FIG. 3 shows a block diagram representing the internal functional structure of the main unit. As shown in the drawing, the main unit essentially consists of a measurement unit 110 and a control unit 120. The measurement unit 110 comprises an interface unit 111 for the sensor heads and an image computing unit 112 for processing the image data obtained from the sensor heads 20A and 20B via the interface unit 111.

The control unit 120 is incorporated with a GUI unit 121 serving as an interface for the image monitor 30 and console unit 40, an image processing unit 122 for suitably processing the image data obtained from the measurement unit 110 and forwarding the image data to the GUI unit 121, an external output interface 124 for forwarding the displacement data output D1 and determination result output D2 which were mentioned earlier to the external equipment, and a control processing unit 123 for generally controlling the overall system.

The data flow in this system is described in the following. A sensor head control unit 111B incorporated in the interface unit 111 controls the intensity of the light emitted from the laser diode 201 (see FIG. 2) so as to suitably adjust the amount of the light received by the CCDs incorporated in the sensor heads 20A and 20B. At the same time, the image data D3 obtained by the CCDs of the sensor heads 20A and 20B is forwarded to the measurement unit 110 under the action of an image capturing unit 111A.

The image data forwarded to the measurement unit 110 is then forwarded to an image transfer unit 112A and a measurement processing unit 112B in the image computing unit 112. The image transfer unit 112A forwards the image data D3 received from the image capturing unit 111A to the image processing unit 122 of the control unit 120.

The process of extracting the measurement point coordinate and the process of measuring the displacement which are essential features of the present invention are achieved mainly by this measurement processing unit 112B.

The control processing unit 123 in the control unit 120 computes the measuring point coordinate (in the direction of the line beam) data D8 from the data D7 received from the measurement processing unit 112B, and forwards it to the image processing unit 112. The image processing unit 122 forwards data D4 including both image data and line bright data to the GUI unit 121. The GUI unit 121 receives various commands from the console unit 40, and edits the display data which is then forwarded to the image monitor 30 as a monitor output D5.

The process of editing the display data which is an essential feature of the present invention is achieved mainly by this image process unit 122 and the GUI (graphic user interface) unit 121.

The mode of operation of the displacement sensor described above in measuring the displacement is now described in the following with reference to the flow chart of FIG. 4. Referring to this drawing, in the first step, the image obtained by the CCDs in the sensor heads is fed to the main unit (step 401).

Figure 5:
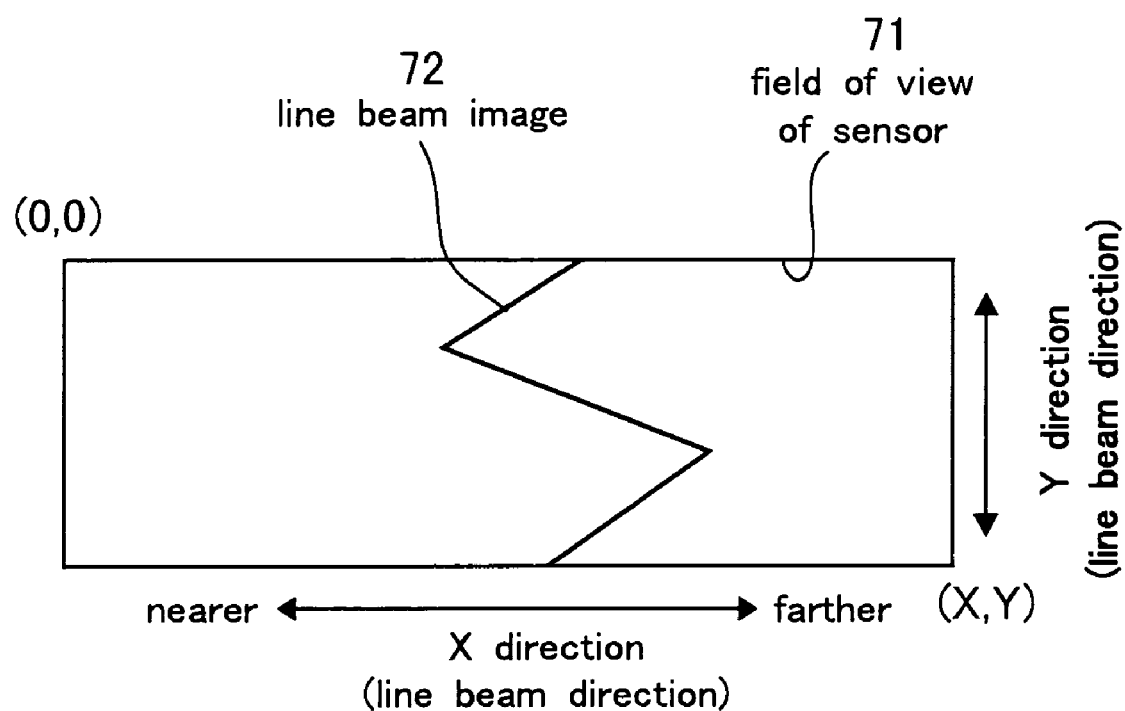
FIG. 5 is an illustrative view showing an image obtained by using the CCD in the sensor head.

The image obtained by the CCDs in the sensor heads is illustrated in FIG. 5. As shown in the drawing, the CCD in each sensor head has a field of view 71 in the shape of an elongated rectangle. The X direction extending along the long side of this field of view corresponds to the displacement direction, and the Y direction extending along the short side corresponds to the direction of the line beam. The field of view 71 of the sensor includes an image 72 of the line beam (image of the illuminating light) in a zigzag shape. In terms of the direction of displacement, the left side in the drawing corresponds to the direction nearer to the sensor head and the right side corresponds to the direction farther from the sensor head.

Figure 6:
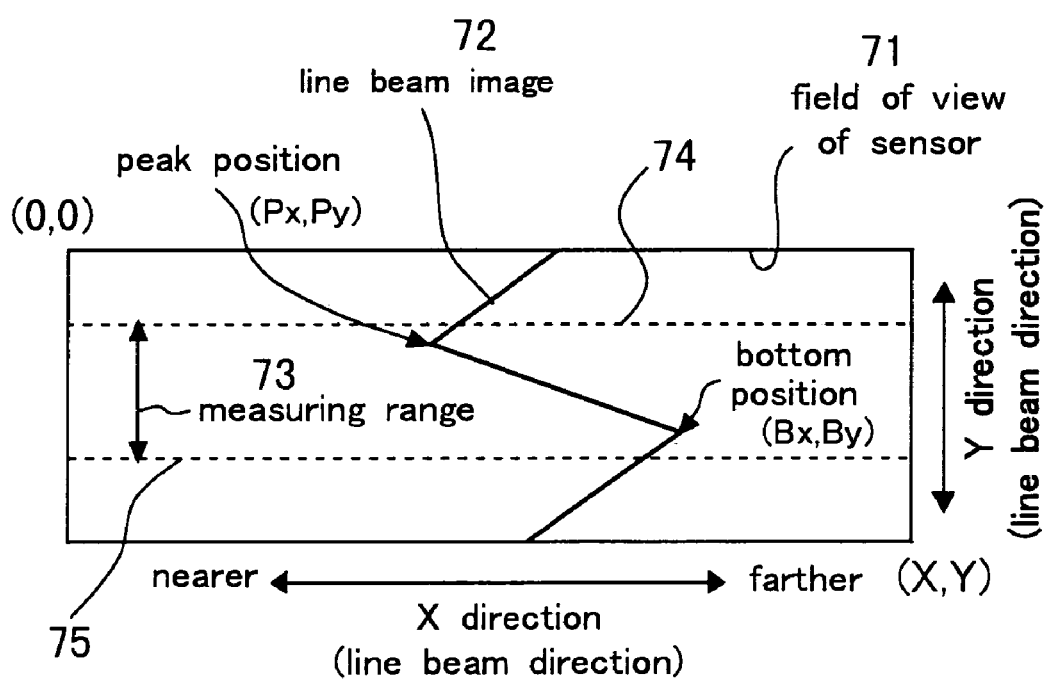
FIG. 6 is an illustrative view showing the process of extracting the measuring point in the measuring range.

Referring to FIG. 4 once again, characteristic points in the range of measurement are extracted (step 402). The process of extracting a measuring point in the range of measurement is illustrated in FIG. 6. As shown in the drawing, a measuring range 73 is indicated in the field of view 71 of the sensor by a pair of dotted lines 74 and 75 which extend laterally across the field in parallel to each other. In this process of extracting a measuring point, by using a prescribed algorithm for extracting characteristic points from this range of measurement (measurement point extraction range) 73, a peak position (Px, Py) and a bottom position (Bx, By) are extracted. As discussed later, the start point line 74 and the end point line 75 defining the range of measurement 73 (measurement point extraction range) are designated by the user.

Figure 4:
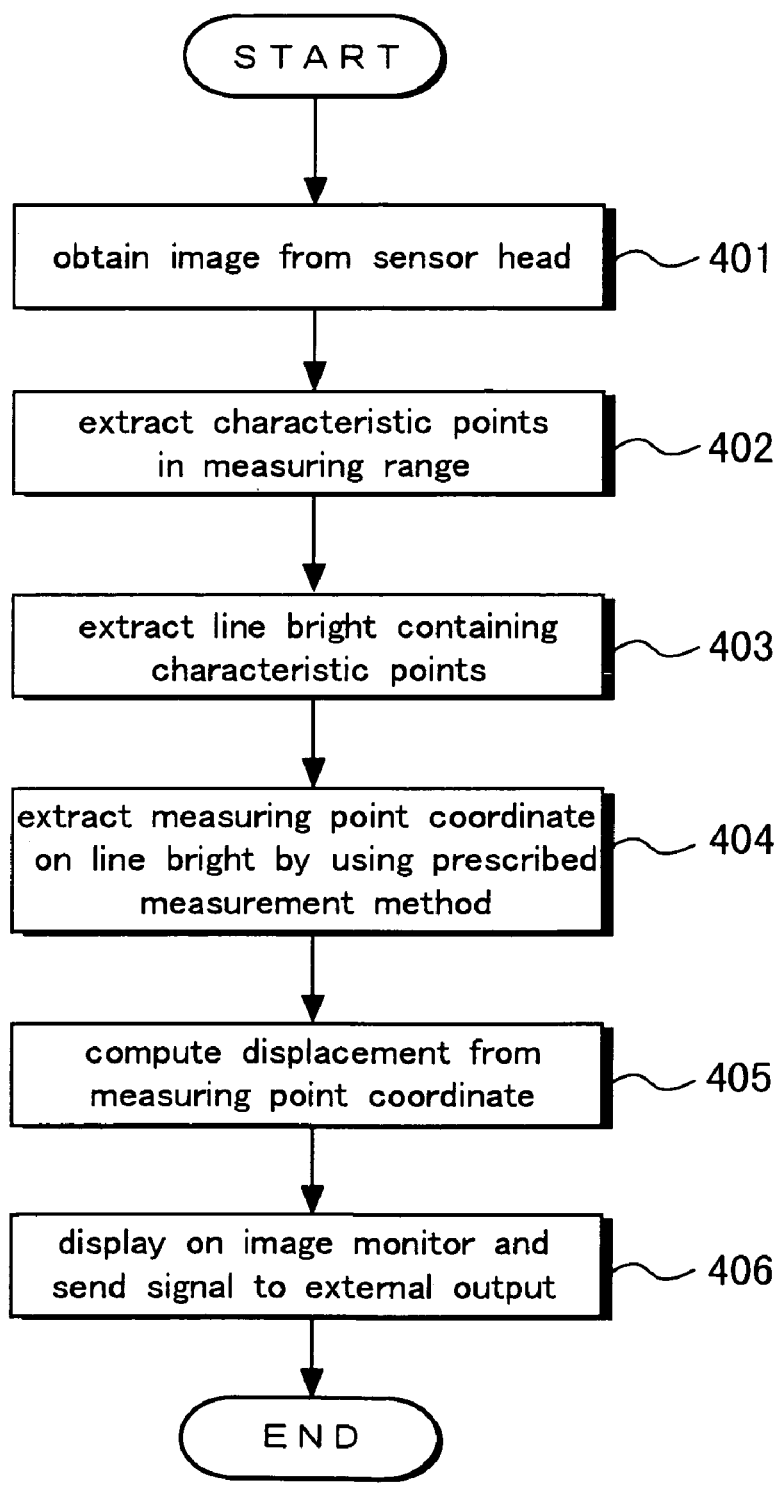
FIG. 4 is a general flow chart schematically showing the process of measuring a displacement by using the displacement sensor.
Figure 7:
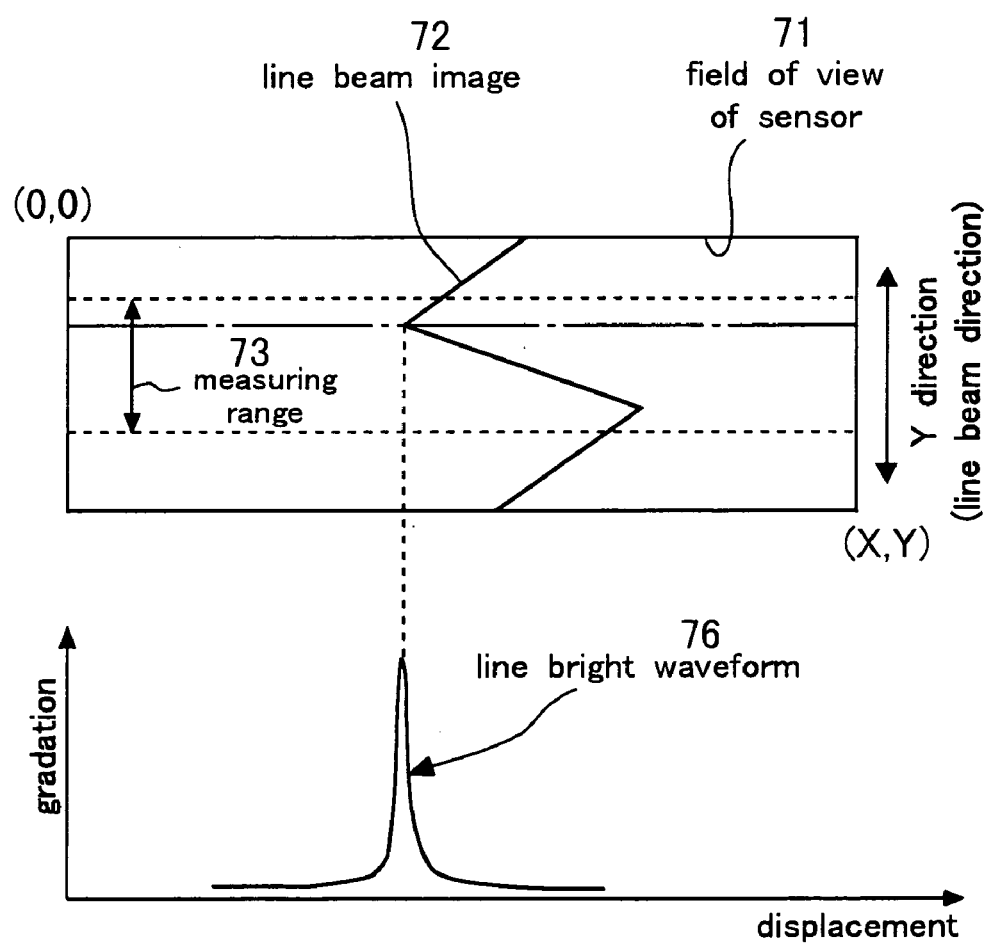
FIG. 7 is an illustrative view showing the relationship between an image obtained by the CCD and the corresponding line bright waveform.

Referring to FIG. 4, the line bright of the line containing the characteristic points is extracted in the following step (step 403). The relationship between the image obtained by the CCD and the line bright waveform is illustrated in FIG. 7. As shown in this drawing, during the process of extracting the line bright, the brightness of the received light for each pixel on the line containing the peak position is extracted as indicated by the chain dot line, and the line bright waveform 76 shown in the drawing is generated by arranging the received light brightness for each pixel along the direction of displacement. As shown in FIG. 7, the line brightness waveform 76 is shown in the orthogonal coordinate system having the displacement on the abscissa axis and the gradation on the ordinate axis.

Figure 8:
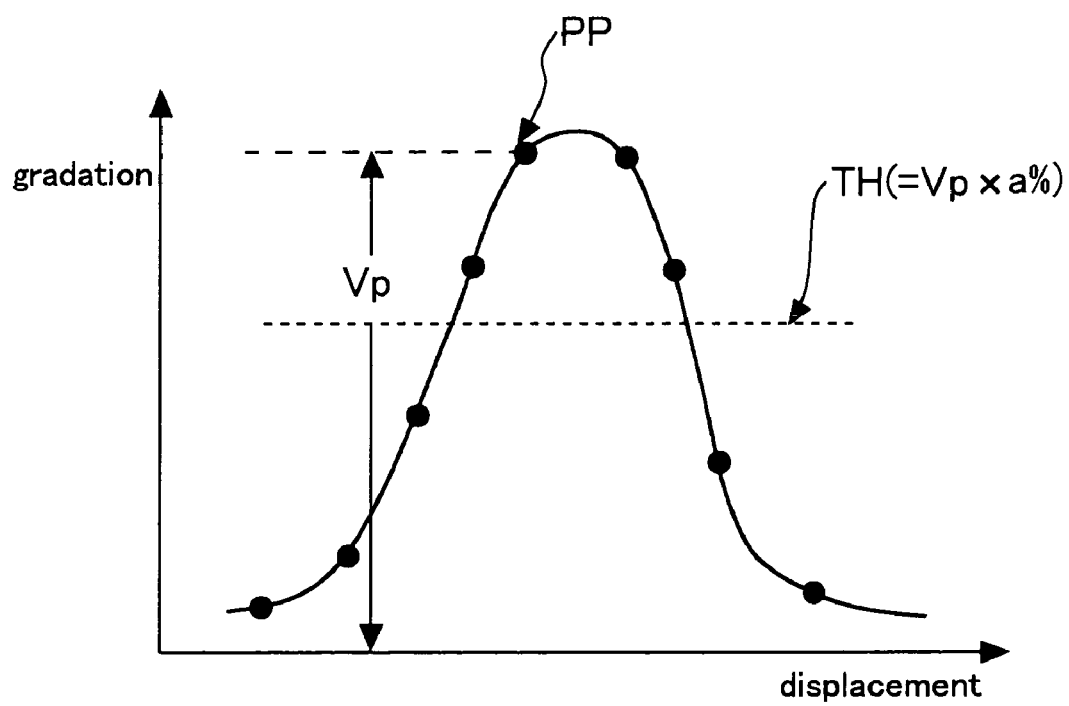
FIG. 8 is an illustrative view showing the process of determining the threshold value.
Figure 9:
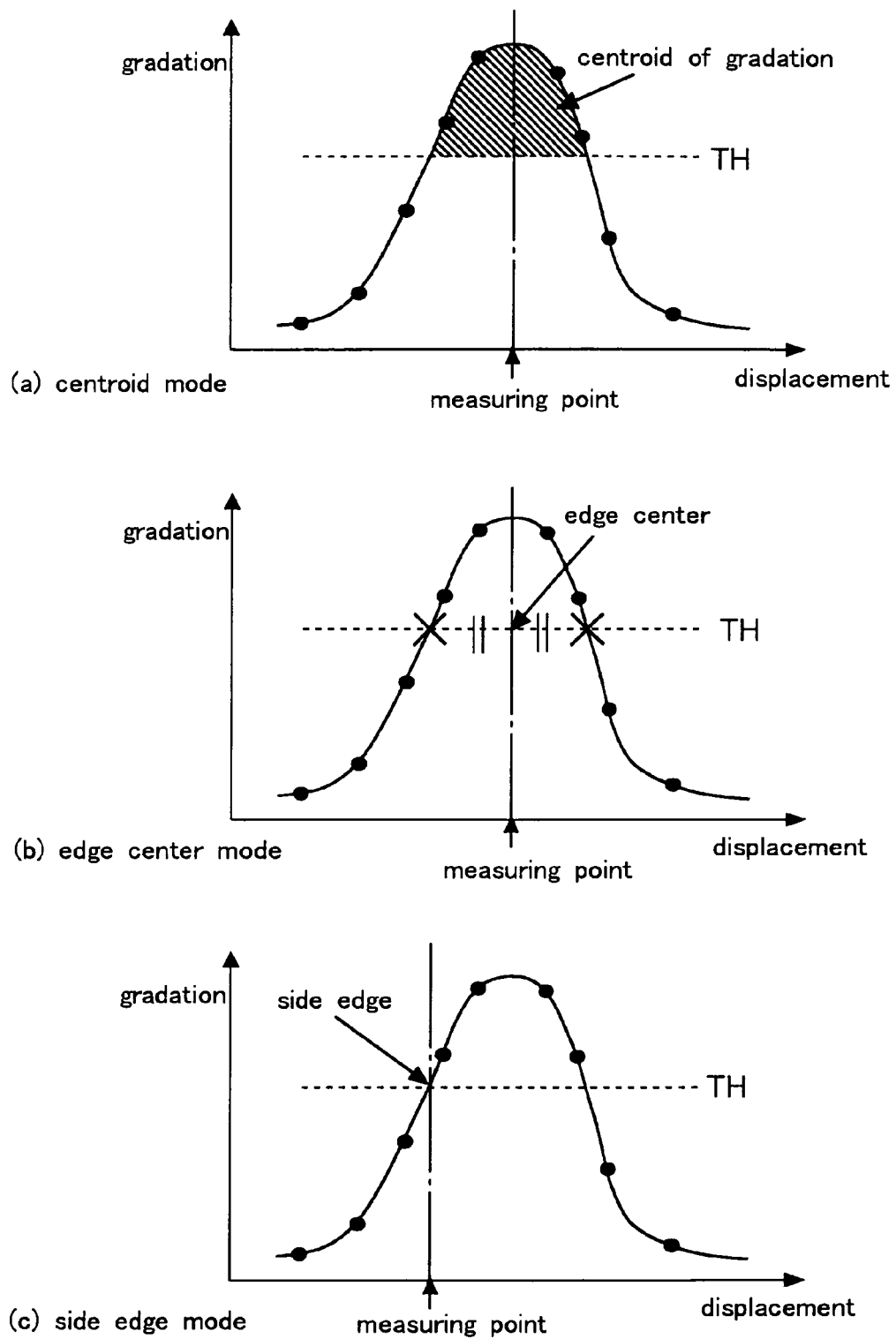
FIG. 9 is an illustrative view showing the process of extracting the measuring point coordinate.

Referring to FIG. 4, the measuring point coordinate on the line bright is extracted according to the prescribed extraction algorithm in the following step (step 404). The process of extracting the measuring point coordinate is conducted via the processes of determining a threshold value and extracting the measuring point coordinate. An exemplary method of determining a threshold value is illustrated in FIG. 8. As shown in the drawing, the threshold value TH is determined as a percentile ratio a% with respect to the brightness Vp of the pixel PP demonstrating the peak value. In other words, it is automatically determined by the formula TH=Vp×a%. The process of extracting the measuring point coordinate is illustrated in FIG. 9. There are three modes available for the process of extracting a measuring point coordinate, or the area centroid method, edge center method and side edge method. As shown in FIG. 9(a), according to the area centroid method, the measuring point is obtained as the centroid of the gradation area exceeding the threshold value TH. According to the edge center mode, the measuring point is determined as the center of two points obtained as the intersections between the line bright waveform and the threshold level TH. According to the side edge mode, the measuring point is obtained as an intersection between a side edge of the line bright waveform with the threshold level TH.

Referring to FIG. 4 once again, the displacement is computed from the measured coordinate (step 405). For instance, when the optical system is based on the triangulation, this displacement computing process produces the displacement according to the formula (displacement Z)=A×B/(C×X), where X is the coordinate in the direction of the displacement, and A, B and C are constants that are determined by the optical system.

Referring to FIG. 4 once again, the obtained displacement (or a determination result if necessary) is forwarded to the image monitor 30 and the external equipment 50 (step 406). The determination result according to a reference value designated by the user is conducted as described in the following.

The determination result is HIGH when the displacement is larger than the HIGH reference value.

The determination result is PASS when HIGH reference value ≧ displacement ≧ LOW reference value (the object is found acceptable).

The determination result is LOW when the displacement is smaller than the LOW reference value.

The determination result is ERROR when the sensor is unable to measure.

Figure 10:
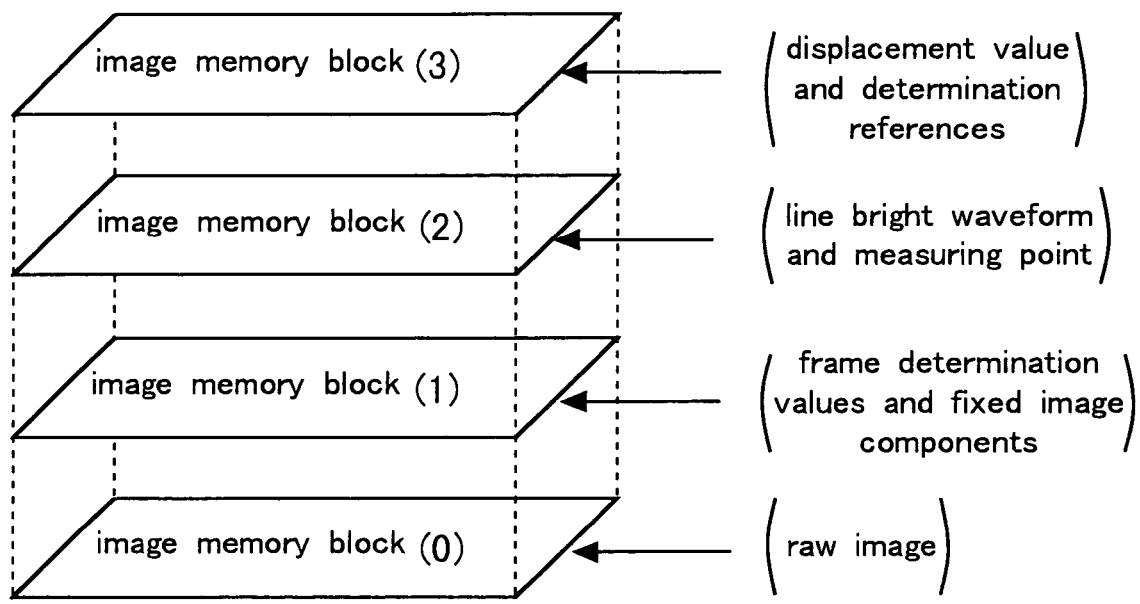
FIG. 10 is an illustrative view showing the process of generating the monitor display.

The process of generating the images on the monitor display is illustrated in FIG. 10. As shown in this drawing, four image memory blocks (layers) (0) to (3) are used. Image memory block (0) stores the raw image obtained from the sensor heads, image memory block (1) stores frame determination values and fixed image components, image memory block (2) stores a line bright waveform and a measuring point, and image memory block (3) stores a displacement value and determination references. The data in these memory blocks is read out in a parallel relationship by the action of the GUI unit 121 and the image processing unit 122, and forwarded to the image monitor 30 as a monitor output (display data) D5.

Examples of a display on the image monitor 30 are described in the following with reference to FIGS. 11 to 15.

Figure 11:
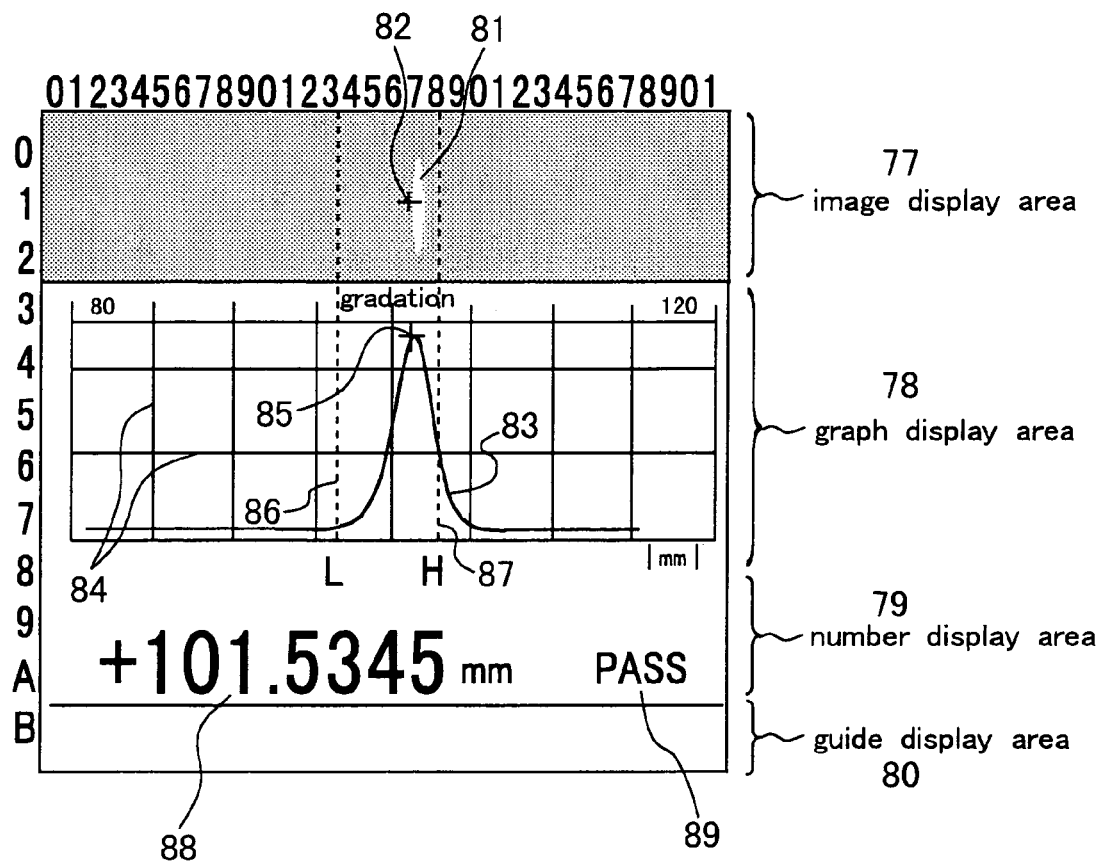
FIG. 11 is a view showing an exemplary monitor display when a normal measurement result is obtained.
Figure 11:
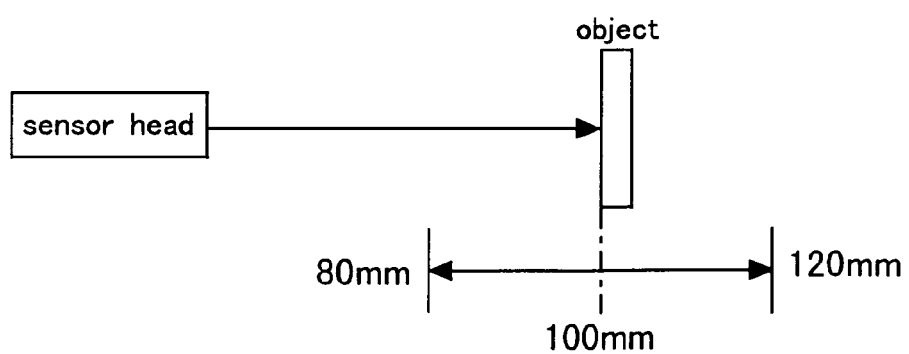

FIG. 11 shows an example of a monitor display when a normal measurement value has been obtained. In this example, as shown in FIG. 11(b), the reference distance between the sensor head and the object to be measured is 100 mm, and the displacement is measured over a range extending by 20 mm from this reference distance in each direction. As shown in FIG. 11(a), the frame of the monitor is divided into four areas arranged in the vertical direction. These areas include an image display area 77, graph display area 78, number display area 79 and guide display area 80, from top to bottom.

The image display area 77 displays a raw image (gradation image) obtained from the imaging device consisting of a two-dimensional CCD. In the drawing, the reference numeral 81 denotes a line beam image, and the reference numeral 82 denotes a cross symbol for indicating the measuring point coordinate on the raw image.

The graph display area 78 displays the line bright waveform along with vertical and horizontal grid lines. The reference numeral 83 denotes the line bright waveform, and the reference numeral 84 denotes the vertical and horizontal grid lines. The two dotted lines extending in the vertical direction are determination reference values for LOW and HIGH.

The number display area 79 shows a number indicating the displacement, and a symbol indicating the determination result. In the drawing, the numeral 88 denotes a value (+101.5345) indicating the measured value, and the numeral 89 denotes a symbol (PASS) indicating the determination result.

Figure 12:
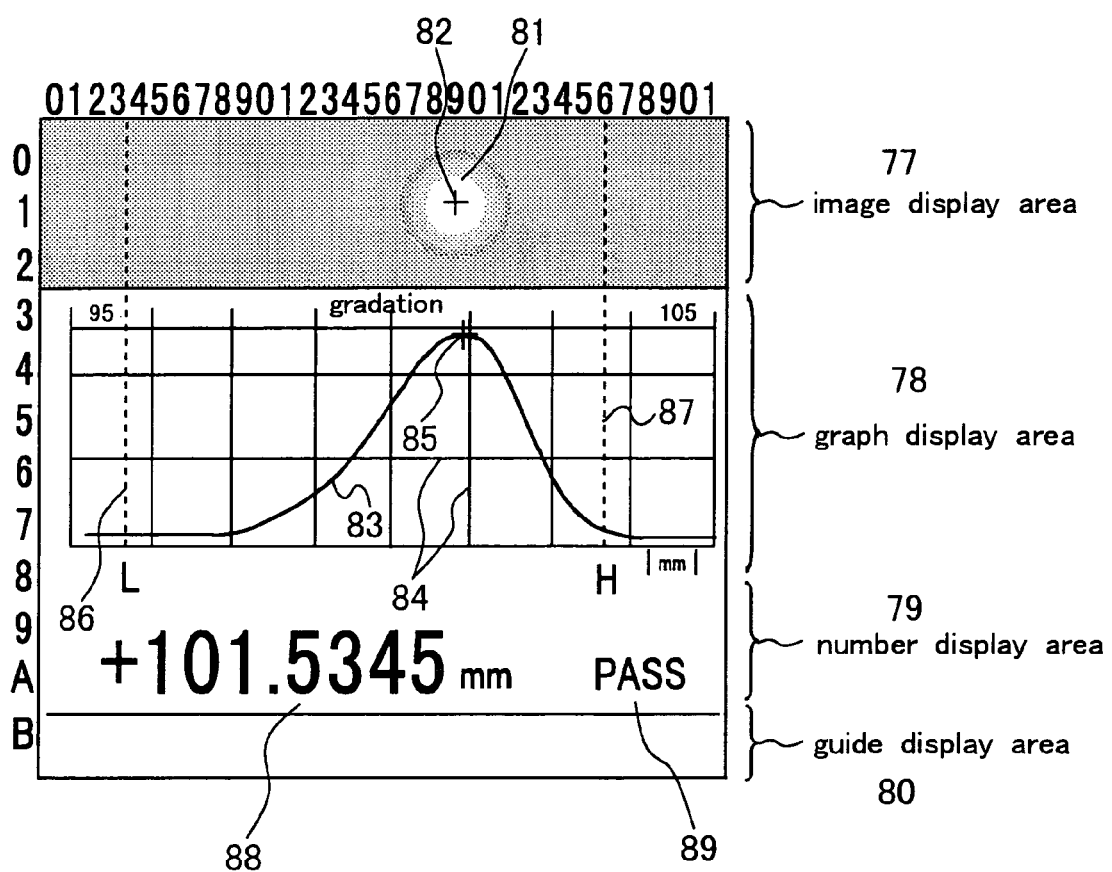
FIG. 12 is an illustrative view showing an exemplary monitor display when the image and the line bright waveform are enlarged in the direction of displacement measurement.

FIG. 12 illustrates an example of a monitor display with the image and line bright waveform enlarged in the direction of the displacement. In this drawing, the parts corresponding to those of FIG. 11 are denoted with like numerals without repeating the description of such parts. As shown in the drawing, the raw image on the image display area 77 and the line bright waveform 83 in the graph display 78 area are both substantially enlarged in the direction of measuring the displacement. For this reason, the image of the line beam denoted by numeral 81 appears to be circular, instead of being shown as linear. By enlarging the display of the raw image and line bright waveform in this manner, the relationship of the measuring point coordinate with the raw image and line bright waveform can be indicated clearly, and is therefore allowed to be verified in a highly accurate manner.

Figure 13:
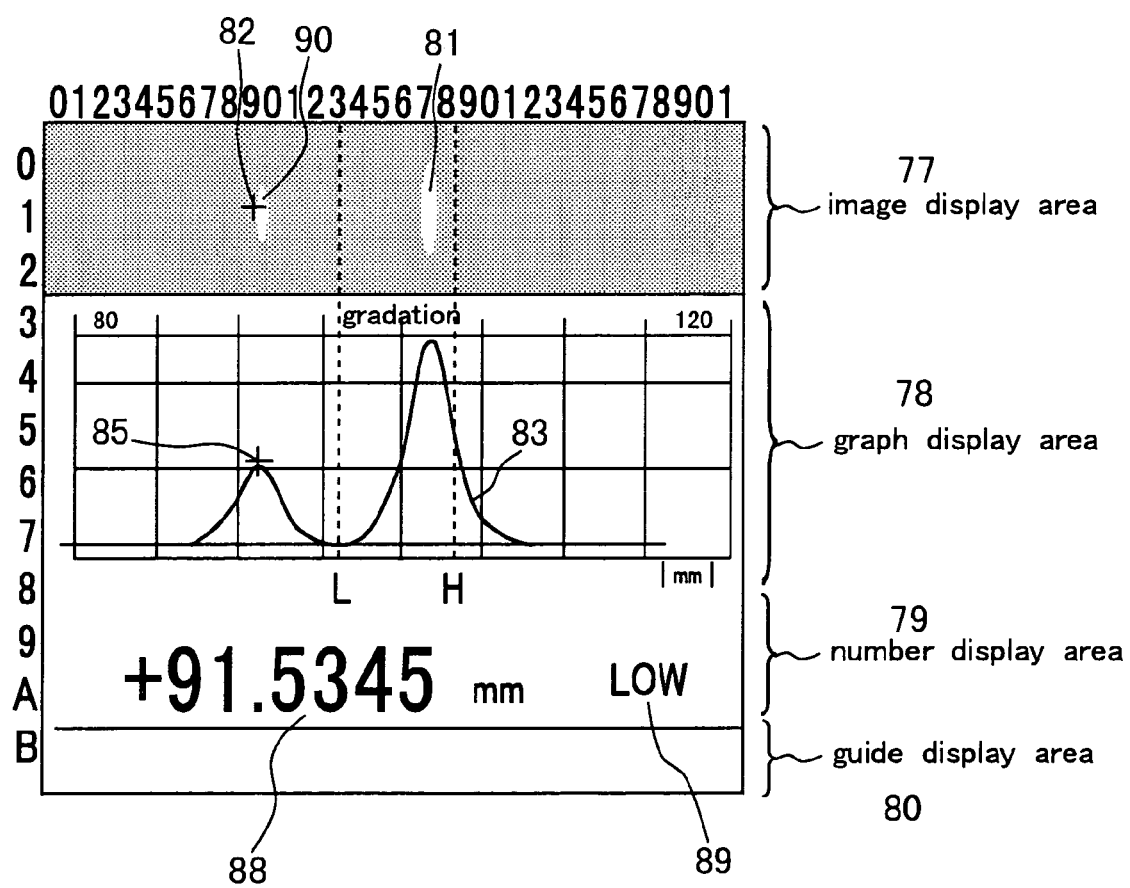
FIG. 13 is an illustrative view showing an exemplary monitor display when an abnormal measurement result is obtained due to external disturbances.

FIG. 13 illustrates an example of a monitor display when an error has occurred in the measurement due to external disturbances. In this drawing, the parts corresponding to those of FIG. 11 are denoted with like numerals without repeating the description of such parts. In this example, although the light image 81 of the normal line beam stays within a prescribed range, and the determination result is LOW which indicates an unacceptable product as denoted by numeral 89. As for the raw image in the image display area 77, the light image due to external light appears below the lower limit value as denoted by numeral 90, and the cross symbol as denoted by numeral 82 indicating the measuring point coordinate falls on this false light image 90. Likewise, in the graph display area 78, although the true peak of the line bright curve 83 falls within the acceptable range, the peak due to external disturbances is located below the lower limit value. It can be seen that the cross symbol as denoted by numeral 85 indicating the measuring point coordinate is located on this peak value which is due to external light. From this display, the user can see that the erroneous measurement was made due to the false light image 90 due to external light, instead of an actual abnormal displacement in the product.

Figure 14:
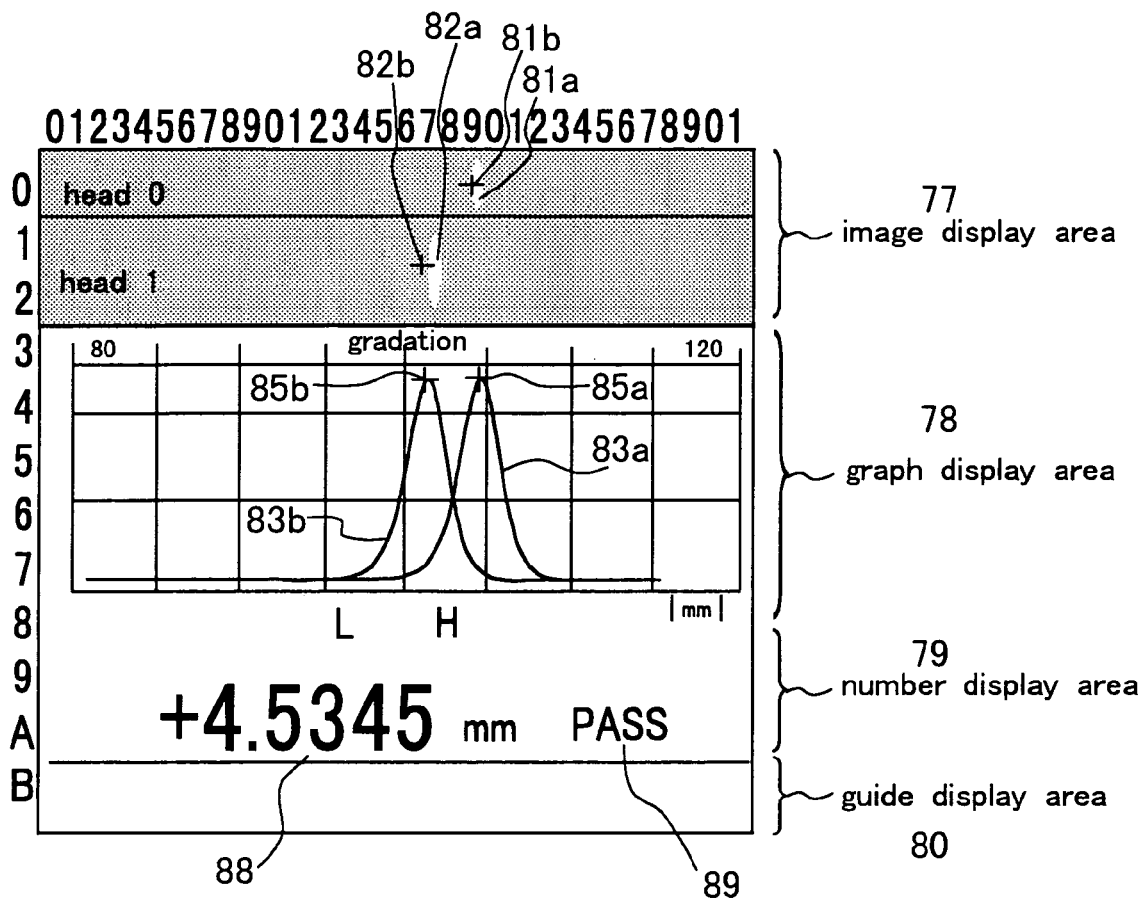
FIG. 14 is an illustrative view showing an exemplary monitor display when a step measurement is conducted by using two sensors at the same time.
Figure 14:
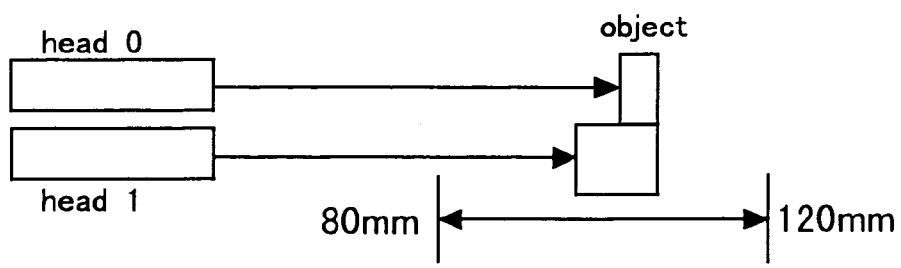

FIG. 14 illustrates an example of a monitor display when a step is to be measured by using two sensor heads at the same time. In this drawing, the parts corresponding to those of FIG. 11 are denoted with like numerals without repeating the description of such parts. In this example, as shown in FIG. 14(b), the two sensor heads (0) and (1) are placed opposite to the object to the measured, and are adapted to measure the respective distances and automatically compute the difference (step) between the two distances. As shown in FIG. 14(a), in this instance, a number (+4.5345) indicating the step is displayed on the number display area 79 as denoted by numeral 88. The image display area is divided into two parts one on top of the other, and the upper part shows the raw image associated with the sensor head (0) while the lower part shows the raw image associated with the sensor head (1). The light images 81a and 82a corresponding to the line beams and the cross symbols 81b and 82b indicating the measuring point coordinates are displayed on these raw images, respectively. The graph display area 78 shows the line bright waveforms 83a and 83b and cross symbols 85a and 85b corresponding to the sensor heads (0) and (1), respectively. Therefore, according to the image display described above, in case of any abnormal situation, one can readily discover which of the sensor heads (0) or (1) has failed. The symbol (PASS) for the determination result denoted with numeral 89 corresponds to the acceptable range for the step.

Figure 15:
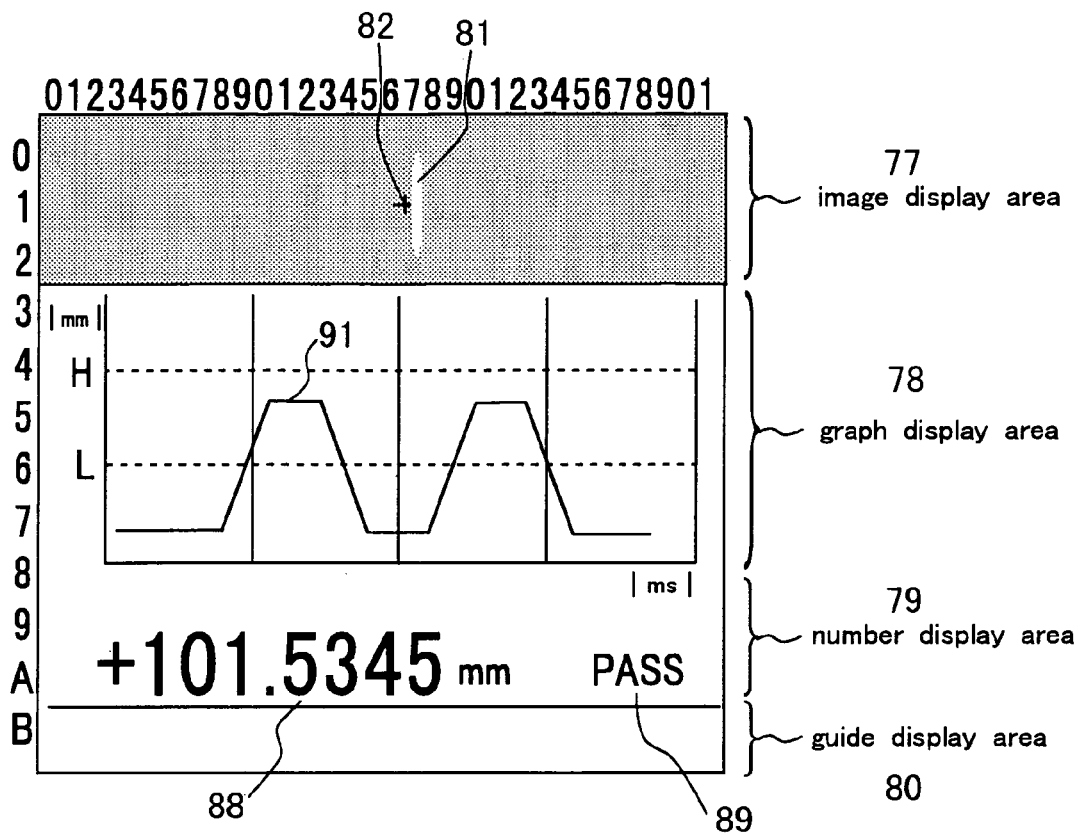
FIG. 15 is a view showing an exemplary monitor display when displacement data is shown in a time sequence.
Figure 15:
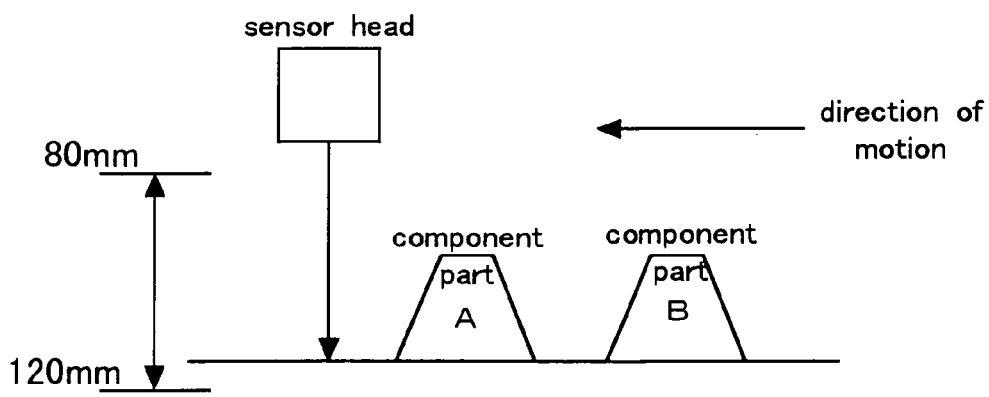

FIG. 15 shows an example of a monitor display when the displacement data is to be displayed in a time sequence. In this drawing, the parts corresponding to those of FIG. 11 are denoted with like numerals without repeating the description of such parts. In this example, as shown in FIG. 15(a), the distance between each component part A or B transported on a belt conveyor and the sensor head is measured one after another, and the result is displayed on the graph display area as a time sequence waveform (trend graph) 91 as shown in FIG. 15(a). The light image 81 of the light beam and the cross symbol 82 indicating the measuring point coordinate at each time point are displayed on the image display area 77. According to this display, the variations of the dimensions of the components A, B can be measured in a clear manner, and the measurement process can be conducted in a highly smooth manner.

The process of defining the measuring range 73 which was described in connection with the previously described exemplary measurement process is now more fully described. As mentioned earlier, the two sensors 20A and 20B are connected to the system in this embodiment. Also, as shown in FIG. 14, a step can be measured by using the two sensors simultaneously. As one can readily appreciate, each of the sensor heads can be selected and adjusted individually.

Figure 16:
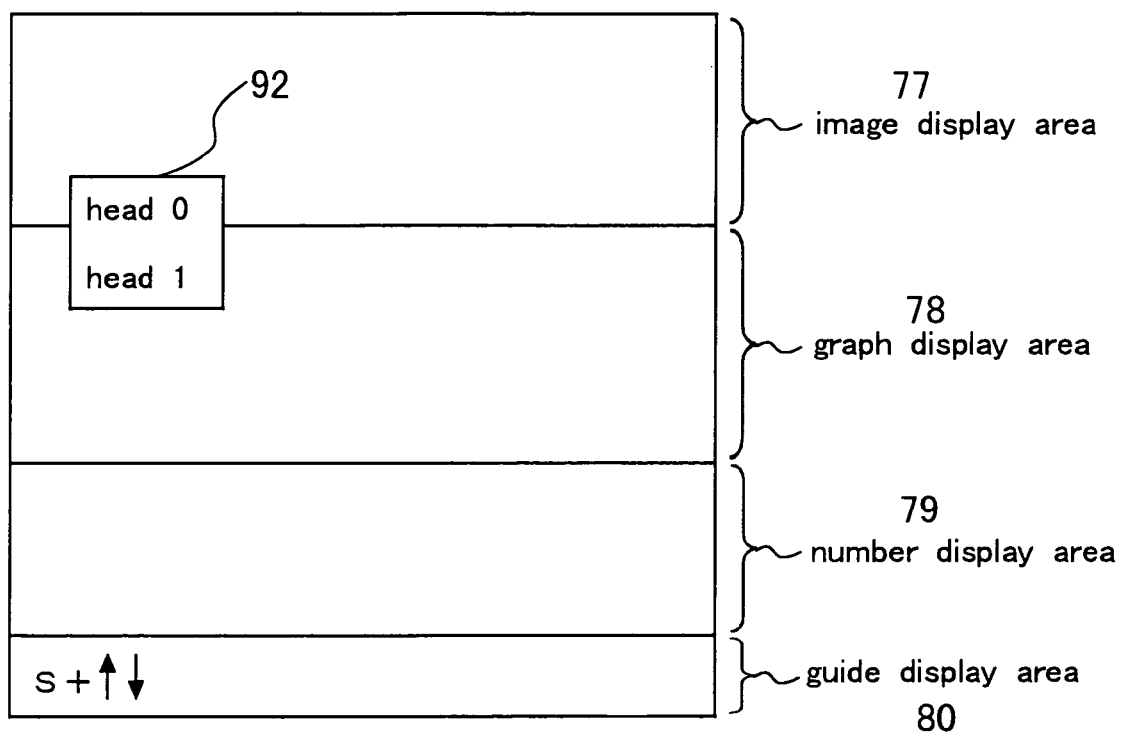
FIG. 16 is an illustrative view showing an exemplary monitor display when a sensor head selection is being conducted.

FIG. 16 illustrates the monitor display when selecting one of the sensor heads. In this drawing, the parts corresponding to those of FIG. 11 are denoted with like numerals without repeating the description of such parts. A dialog box 92 is opened by acting upon the console unit 40 which is connected to the system main body, and either one of the sensors heads 20A or 20B can be selected by conducting a suitable operation.

Figure 17:
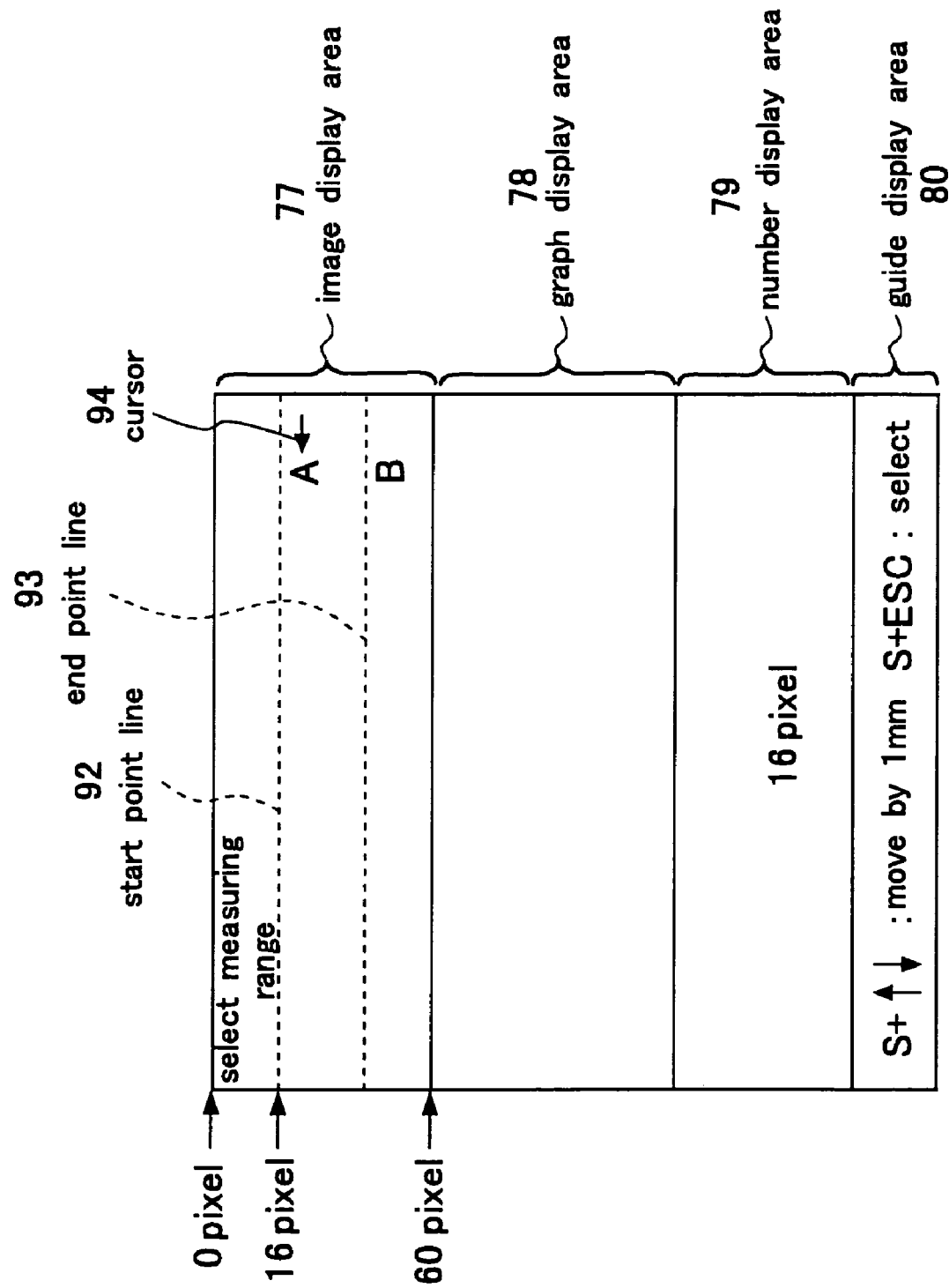
FIG. 17 is an illustrative view showing an exemplary monitor display when the start point of the measuring range in the beam line direction is being determined.

FIG. 17 illustrates a monitor display when the start point for the range of measurement in the direction of the beam line is to be defined. In this drawing, the parts corresponding to those of FIG. 11 arc denoted with like numerals without repeating the description of such parts. During the process of selecting the range of measurement, the start point line 92 and end point line 93 are drawn in the image display area 77 as indicated by the dotted lines extending horizontally in the drawing. These lines 92 and 93 can be moved vertically as a translational motion on the monitor by conducting a suitable operation. When determining the start point line 92, the cursor 94 is placed on the start point line (A) 92 by a suitable operation. The start point line 92 is placed on a desired pixel position in this state, and the start point line 92 can be placed at a desired position by conducting a suitable operation. In the drawing, the start point line 92 is placed on the 16th pixel.

Figure 18:
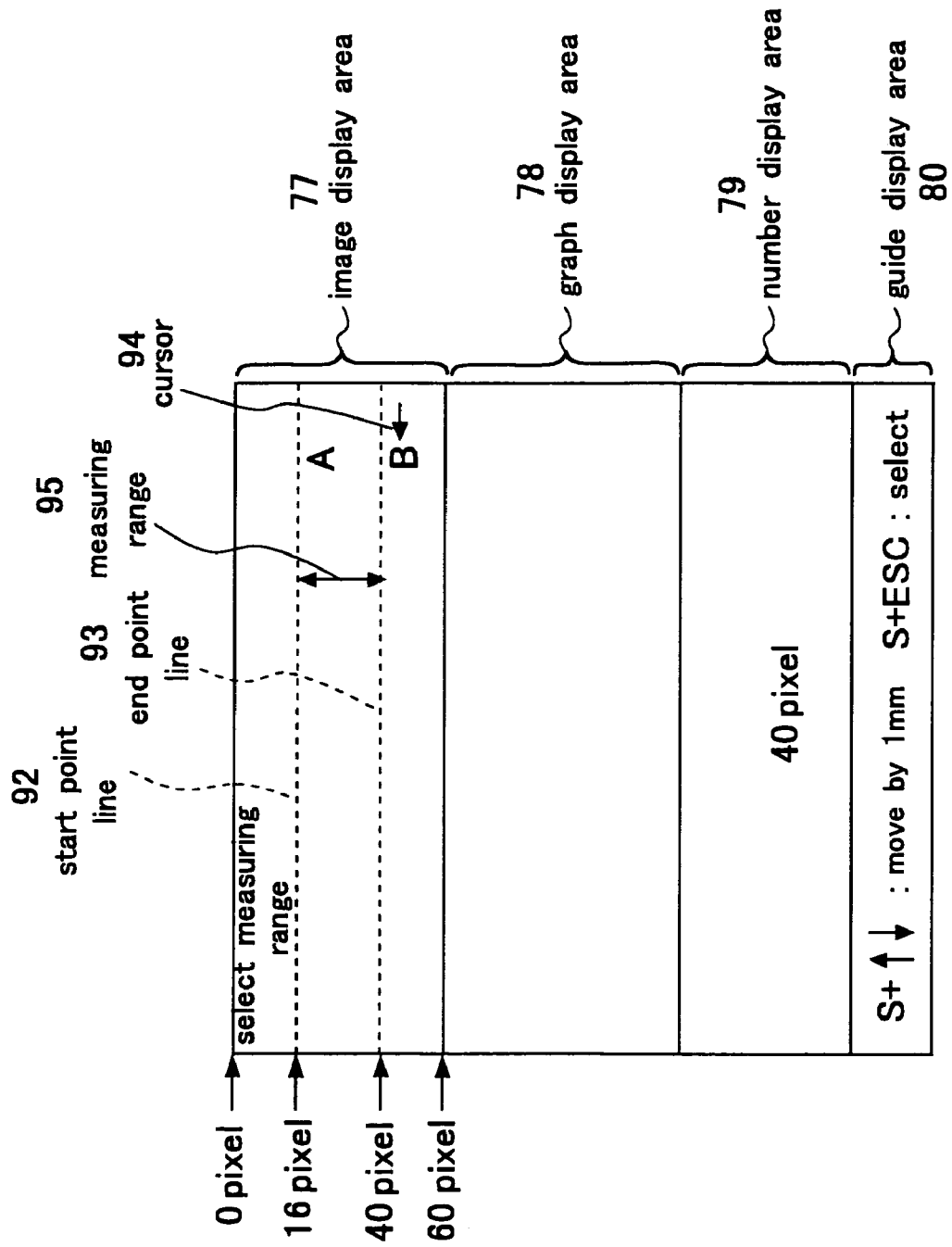
FIG. 18 is an illustrative view showing an exemplary monitor display when the end point of the measuring range in the beam line direction is being determined.

FIG. 18 illustrates a monitor display when the end point for the range of measurement in the direction of the beam line is to be defined. In this drawing, the parts corresponding to those of FIG. 11 are denoted with like numerals without repeating the description of such parts. When placing the end point line 93 at a desired location, the cursor 94 is placed on the end point line (B) 93 and the end point line (B) 93 is moved vertically until the desired position is reached by conducting a suitable operation. In this example, the end point line 93 is placed on the 40th pixel. During this process, the positions of the start point line 92 and end point line 93 are displayed on the number display area 79. Thus, the measuring range (measuring range extraction range) 95 is defined between the 16th pixel and 40th pixel.

The process of extracting characteristic points (measuring point) in the measuring range according to three different modes (normal mode, peak mode and bottom mode) following the process of defining the measuring range is described in the following.

Figure 19:
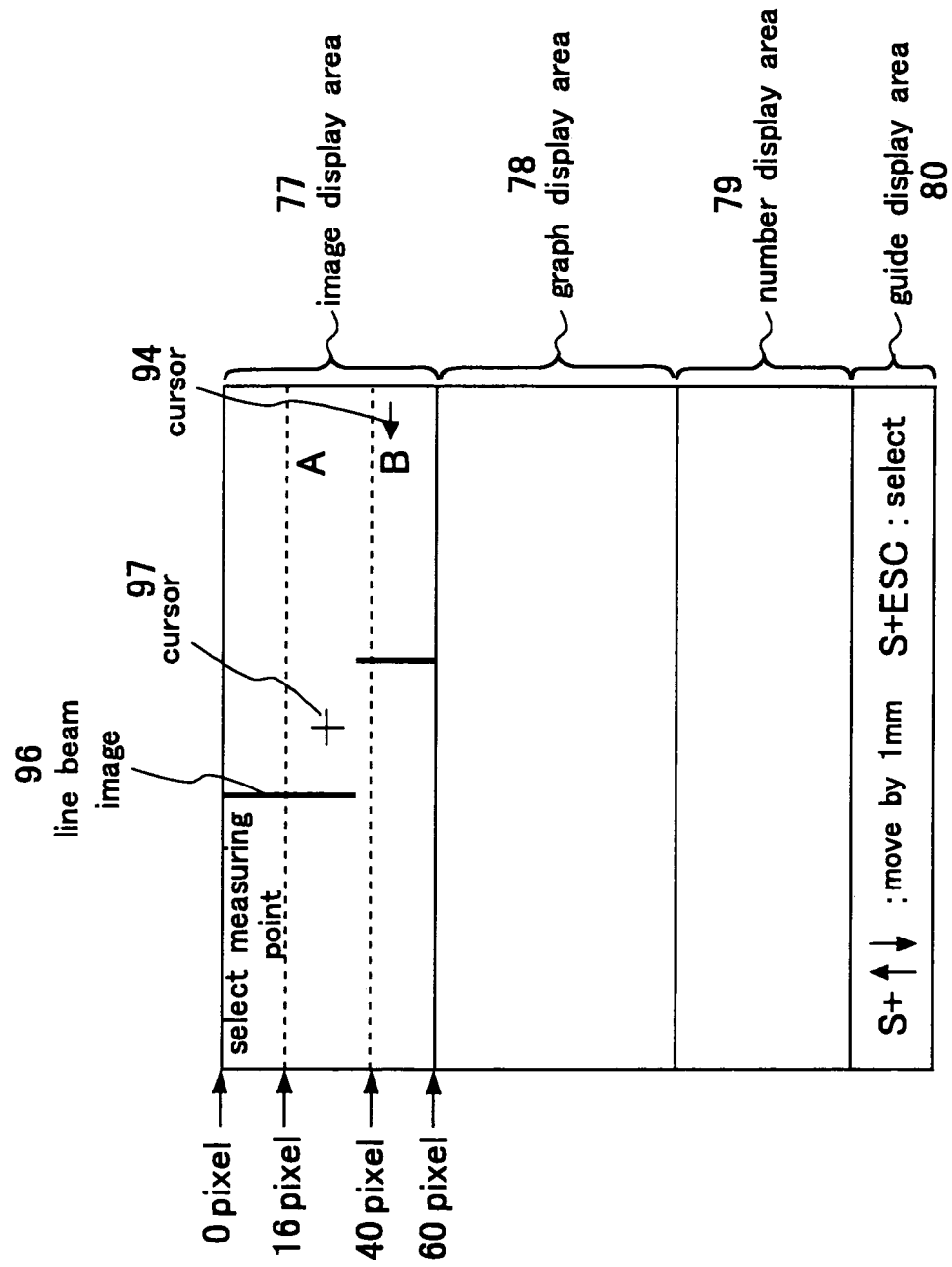
FIG. 19 is an illustrative view showing an exemplary monitor display when the measuring point of the measuring range in the beam line direction is being extracted (normal mode)

FIG. 19 illustrates a monitor display (normal mode) when the measuring point in the range of measurement in the direction of the beam line is being extracted. In this drawing, the parts corresponding to those of FIG. 11 are denoted with like numerals without repeating the description of such parts. As shown in the drawing, an image 96 of the line beam having a flat peak and a flat bottom is shown on the image display area 77. In the normal mode, the measuring point is automatically defined between the peak position and bottom position. The cross symbol (cursor) denoted by numeral 97 indicates the position of the measuring point. In the normal mode, the measuring point is thus automatically determined between the peak position and bottom position within the measuring range located between the 16th pixel and 40th pixel.

Figure 20:
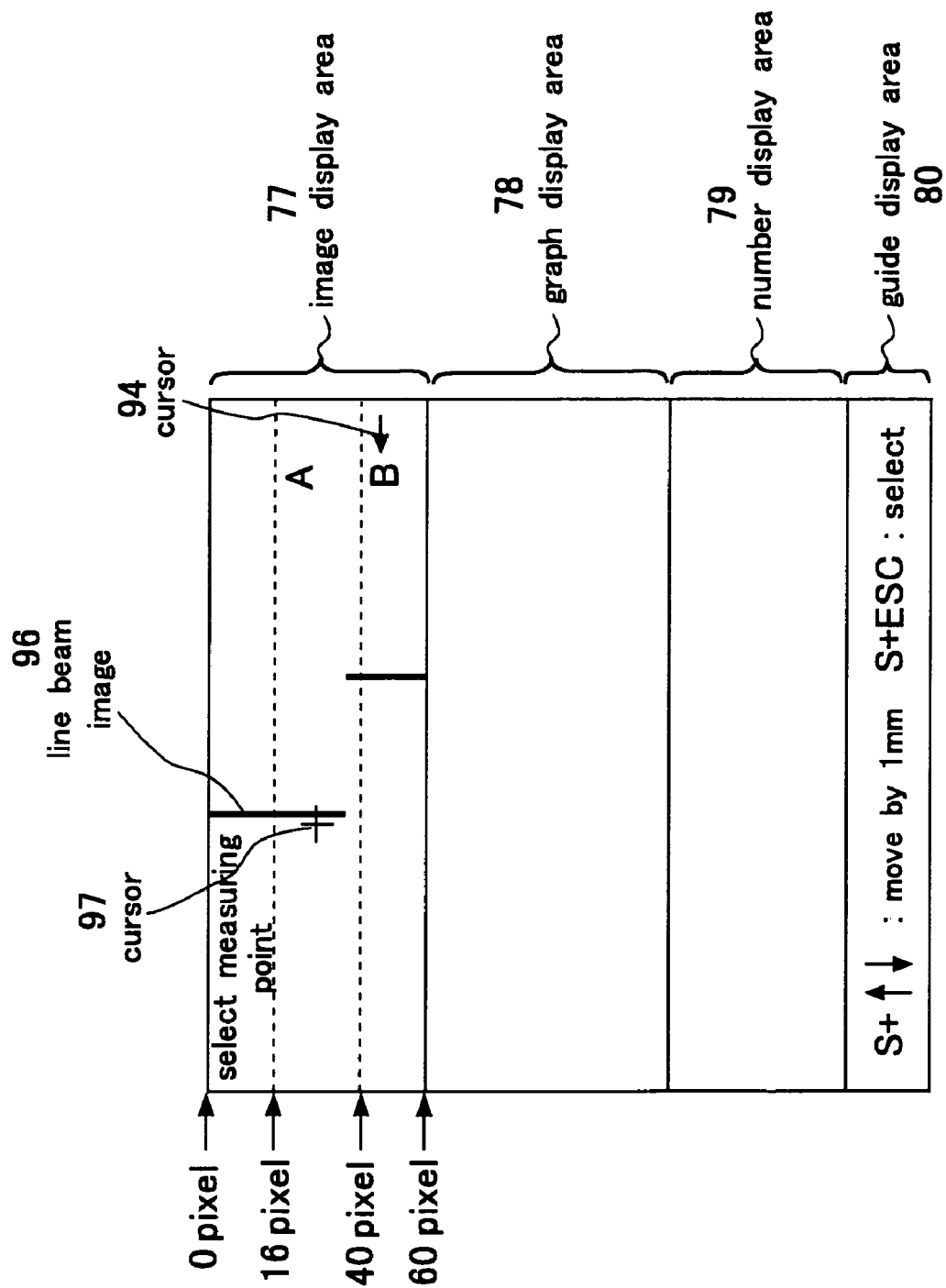
FIG. 20 is an illustrative view showing an exemplary monitor display when the measuring point of the measuring range in the beam line direction is being extracted (peak mode)

FIG. 20 illustrates a monitor display (peak mode) when the measuring point in the range of measurement in the direction of the beam line is being extracted. In this drawing, the parts corresponding to those of FIG. 11 are denoted with like numerals without repeating the description of such parts. As shown in the drawing, an image 96 of the line beam having a flat peak and a flat bottom is shown on the image display area 77. In the peak mode, the measuring point is defined at the peak position. The cross symbol (cursor) denoted by numeral 97 indicates the position of the measuring point. In the peak mode, the measuring point is thus automatically determined at the peak position within the measuring range located between the 16th pixel and 40th pixel.

Figure 21:
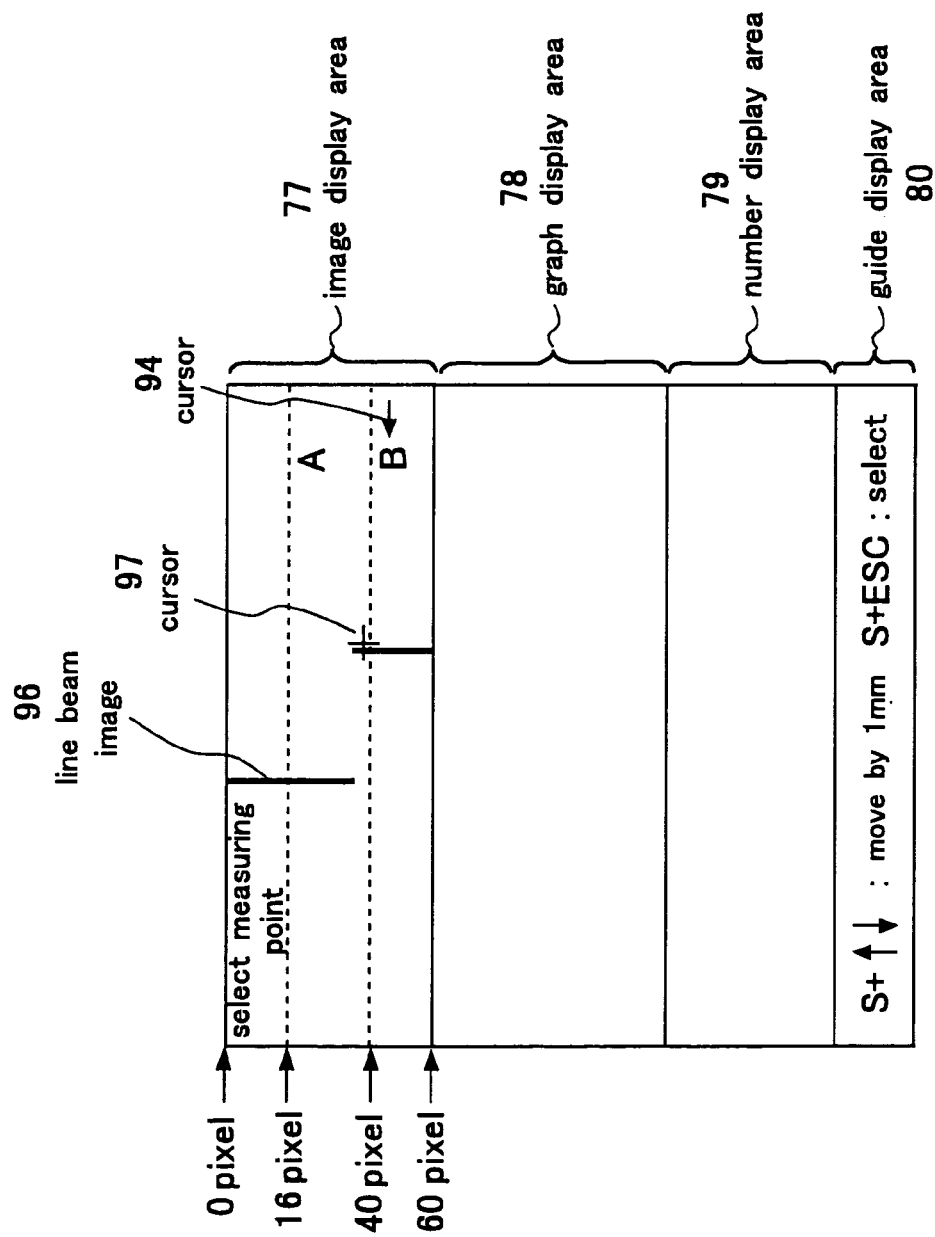
FIG. 21 is an illustrative view showing an exemplary monitor display when the measuring point of the measuring range in the beam line direction is being extracted (bottom mode)

FIG. 21 illustrates a monitor display (bottom mode) when the measuring point in the range of measurement in the direction of the beam line is being extracted. In this drawing, the parts corresponding to those of FIG. 11 are denoted with like numerals without repeating the description of such parts. As shown in the drawing, an image 96 of the line beam having a flat peak and a flat bottom are shown on the image display area 77. In the bottom mode, the measuring point is defined at the bottom position. The cross symbol (cursor) denoted by numeral 97 indicates the position of the measuring point. In the bottom mode, the measuring point is thus automatically determined at the bottom position within the measuring range located between the 16th pixel and 40th pixel.

Figure 22:
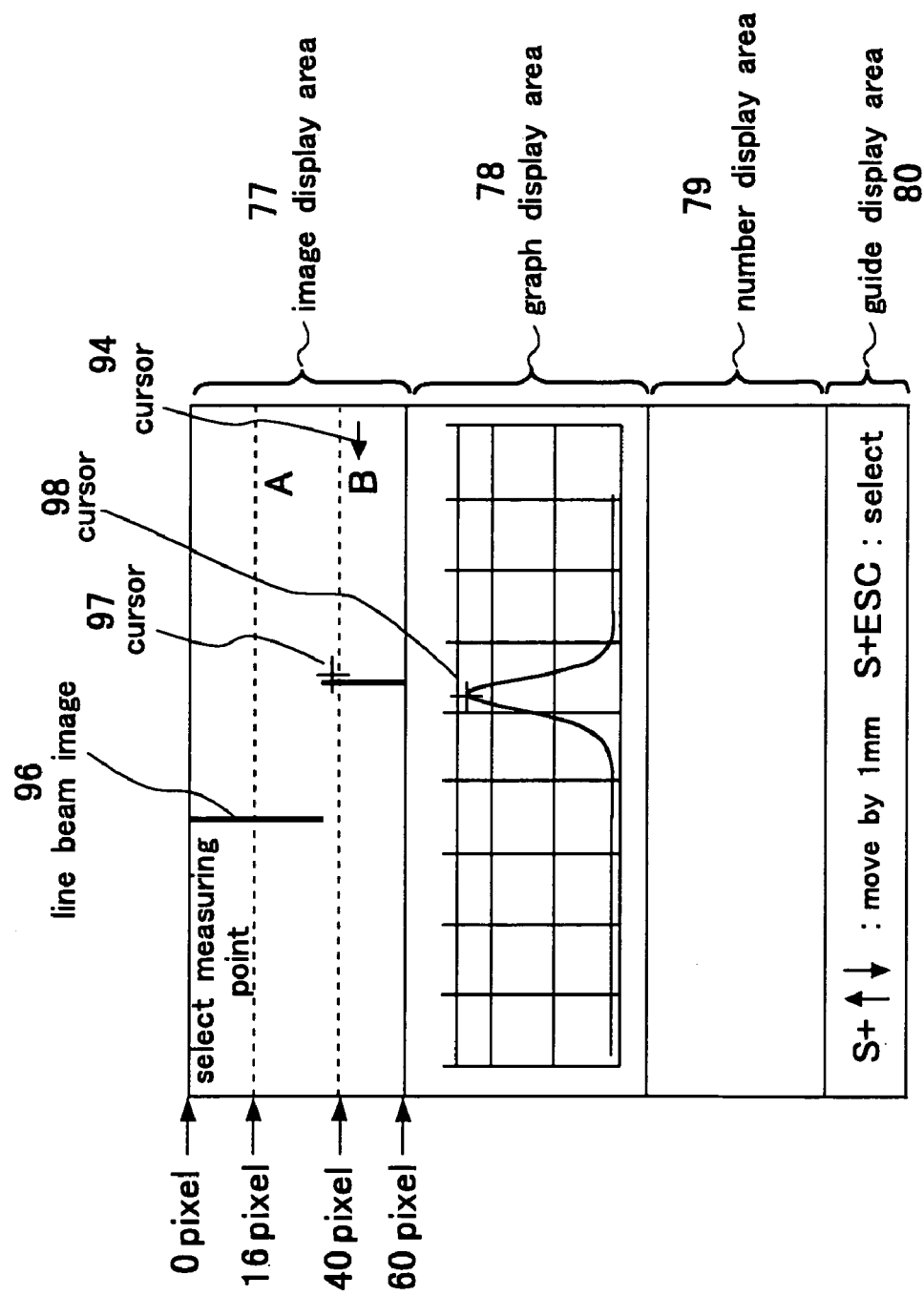
FIG. 22 is an illustrative view showing an exemplary monitor display when the measuring point on the line bright is being extracted.

FIG. 22 illustrates a monitor display when the measuring point on the line bright is being extracted. In this drawing, the parts corresponding to those of FIG. 11 are denoted with like numerals without repeating the description of such parts. As shown in the drawing, the line bright waveform is drawn in the graph display area 78, and the cursor 98 indicating the measuring point coordinate is displayed at a point adjacent to the peak position. The cursors 97 and 98 may be aligned with each other on a vertical line. According to this arrangement, by comparing the image display area 77 and graph display area 78, the measuring point can be even more accurately verified.

Figure 23:
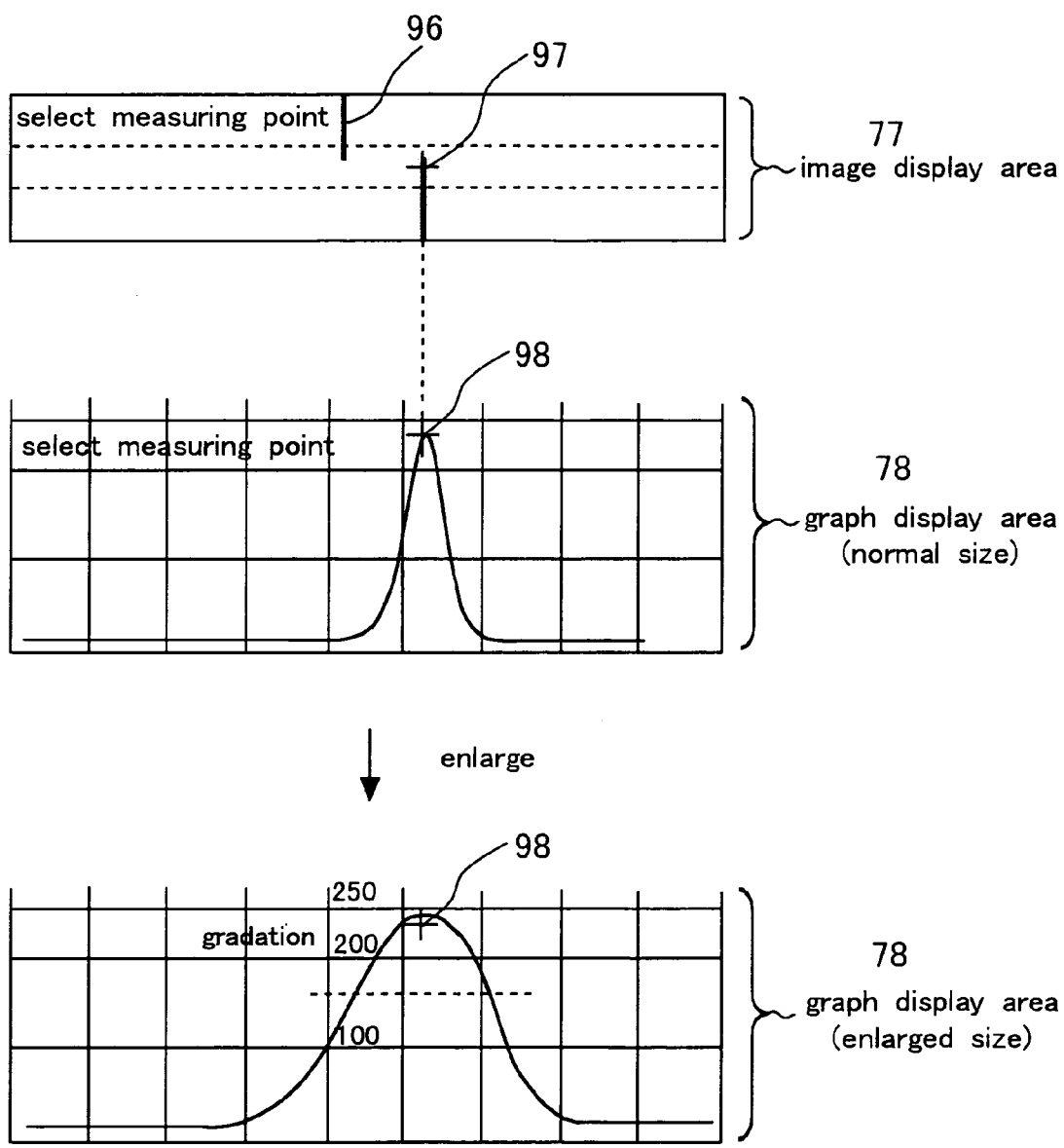
FIG. 23 is an illustrative view showing an exemplary monitor display when the measuring point on the line bright is being extracted.

FIG. 23 illustrates a monitor display when the measuring point on the line bright is being extracted. In this drawing, the parts corresponding to those of FIG. 11 are denoted with like numerals without repeating the description of such parts. As can be appreciated by comparing the graph display area (normal size) 78 and the graph display area (enlarged size) 78', the line bright waveform is enlarged in the direction of measuring the displacement in this example. As a result, the line bright waveform displayed in the graph display area (enlarged size) 78' allows the relationship between the measuring point coordinate and the line bright waveform to be verified even better. This operation can be enabled by selecting the enlarged mode after verifying the measuring point coordinate in the graph display area (normal size) 78.

As can be appreciated from the foregoing description, this displacement sensor enables the user not only to verify the result of displacement measurement but also to display various items of data (raw image, line bright waveform and various threshold values) which are used from the time the raw image is obtained until the time the displacement is measured on the monitor screen. Therefore, even when an abnormal displacement measurement result is obtained, one can readily determine if it is due to the abnormal state of the object to be measured or due to the faulty operation of the system caused by external light, and appropriate measures against such situations can be taken without any delay, for instance when applied to a production line.

In particular, because the raw image and line bright waveform are placed one next to the other on the monitor screen, if an abnormal measurement result is produced due to external light, one can readily discover the cause in an accurate manner by comparing the raw image with the line bright waveform.

Also, because the measuring range is defined not only in the direction of displacement measurement but also in the perpendicular direction, when the image of the line beam is offset in the field of view of the two-dimensional CCD or the measuring point on the object to be measured is offset in the field of view of the CCD, it is possible to more finely define the measuring point by taking into account such an offsetting, and this contributes to an even more accurate displacement measurement.

It is also possible to display the two outputs from the two sensors which operate at the same time on the monitor screen one over the other or one next to the other. Therefore, when a step is desired to be measured by using the two sensor heads, even in case of an error, it can be immediately and accurately determined which of the sensors is faulty.

When a plurality of objects are carried by a belt conveyor, the displacement of each object can be displayed on the monitor screen in a time sequence, and this feature is highly convenient for use in a testing process in a production line.

As can be appreciated from the foregoing description, according to the present invention, the data which is used from the time the raw image is obtained until the time the displacement is computed can be easily verified. Therefore, when the measured displacement is found to be abnormal, it can be determined if the object to be measured is indeed abnormal or if it is due to the faulty operation of the sensor due to external light. Also, according to the present invention, the measuring point can be extracted by freely limiting the field of view of the imaging device. Thus, according to the present invention, the convenience of such a displacement sensor can be substantially enhanced.

Although the present invention has been described in terms of preferred embodiments thereof, it is obvious to a person skilled in the art that various alterations and modifications are possible without departing from the scope of the present invention which is set forth in the appended claims.

What is claimed is:

1. A displacement sensor for automatically extracting a coordinate of a measuring point from an image obtained by using an imaging device according to a prescribed measuring point extraction algorithm, and computing a desired displacement from the automatically extracted measuring point coordinate, characterized by that:

the sensor further comprises display data editing means for editing at least part of data used from the time of obtaining the image until the time of computing the displacement for use as display data for an image monitor, and wherein the display data for the image monitor comprises a raw image obtained by the imaging device.

2. A displacement sensor according to claim 1, wherein the display data for the image monitor further comprises a graphic image indicating a measuring point coordinate which is shown in association with the raw image.

3. A displacement sensor according to claim 1, wherein the display data for the image monitor further comprises a graphic image indicating a tolerance range for a measurement value in a direction for measuring the displacement which is shown in association with the raw image.

4. A displacement sensor according to claim 1, wherein the display data for the image monitor further comprises a graphic image indicating a measuring point coordinate and a tolerance range for a measurement value in a direction for measuring the displacement which are shown in association with the raw image.

5. A displacement sensor according to claim 1, wherein the editing means is adapted to enlarge an image based on the display data in the direction for displacement measurement.

6. A displacement sensor for automatically extracting a coordinate of a measuring point from an image obtained by using an imaging device according to a prescribed measuring point extraction algorithm, and computing a desired displacement from the automatically extracted measuring point coordinate, characterized by that:

the sensor further comprises display data editing means for editing at least part of data used from the time of obtaining the image until the time of computing the displacement for use as display data for an image monitor, and wherein the display data comprises an image of a line bright waveform obtained from a raw image.

7. A displacement sensor according to claim 6, wherein the display data further comprises a graphic image indicating a measuring point coordinate shown in association with the line bright waveform.

8. A displacement sensor according to claim 6, wherein the display data further comprises a graphic image indicating a threshold level for extracting the measuring point coordinate shown in association with the line bright waveform.

9. A displacement sensor according to claim 6, wherein the display data further comprises a graphic image indicating a tolerance range for a measurement value in a direction for measuring the displacement which is shown in association with the line bright waveform.

10. A displacement sensor according to claim 6, wherein the display data further comprises a graphic image indicating a measuring point coordinate and a tolerance range for a measurement value in a direction for measuring the displacement which is shown in association with the line bright waveform.

11. A displacement sensor according to claim 6, wherein the editing means is adapted to enlarge an image based on the display data in the direction for displacement measurement.

12. A displacement sensor for automatically extracting a coordinate of a measuring point from an image obtained by using an imaging device according to a prescribed measuring point extraction algorithm, and computing a desired displacement from the automatically extracted measuring point coordinate, characterized by that:

the sensor further comprises display data editing means for editing at least part of data used from the time of obtaining the image until the time of computing the displacement for use as display data for an image monitor, and wherein the display data for the image monitor comprises a raw image obtained from the imaging device and a line bright waveform obtained from the raw image for display on a monitor in a prescribed relationship.

13. A displacement sensor according to claim 12, wherein the display data further comprises a graphic image indicating a measuring point coordinate shown in association with the raw image and/or the line bright waveform.

14. A displacement sensor according to claim 12, wherein the display data further comprises a graphic image indicating a tolerance range for a measurement value in a direction for measuring the displacement shown in association with the raw image and/or the line bright waveform.

15. A displacement sensor according to claim 12, wherein the display data further comprises a graphic image indicating a measuring point coordinate and a tolerance range for a measurement value in a direction for measuring the displacement in association with the raw image and/or the line bright waveform.

16. A displacement sensor according to claim 12, wherein the editing means is adapted to enlarge an image based on the display data in the direction for displacement measurement.

17. A displacement sensor according to claim 1, wherein the display data further comprises a graphic image indicating a measuring point extracting range defined in a direction perpendicular to the direction of displacement measurement which is shown in association with the raw image.

18. A displacement sensor according to claim 1, wherein the display data further comprises a graphic image indicating a measuring point extracting range defined in a direction perpendicular to the direction of displacement measurement and an automatically extracted measuring point coordinate which is shown in association with the raw image.

19. A displacement sensor for automatically extracting a coordinate of a measuring point from an image obtained by using an imaging device according to a prescribed measuring point extraction algorithm, and computing a desired displacement from the automatically extracted measuring point coordinate, characterized by that:

the sensor further comprises display data editing means for editing at least part of data used from the time of obtaining the image until the time of computing the displacement for use as display data for an image monitor, and wherein the display data comprises a trend graph image showing a plurality of computed displacements in a time sequence.

* * * * *